(12) United States Patent
Wang

(10) Patent No.: US 9,245,345 B2
(45) Date of Patent: Jan. 26, 2016

(54) DEVICE FOR GENERATING THREE DIMENSIONAL FEATURE DATA, METHOD FOR GENERATING THREE-DIMENSIONAL FEATURE DATA, AND RECORDING MEDIUM ON WHICH PROGRAM FOR GENERATING THREE-DIMENSIONAL FEATURE DATA IS RECORDED

(75) Inventor: Jing Wang, Osaka (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 41 days.

(21) Appl. No.: 14/127,477

(22) PCT Filed: Jun. 27, 2012

(86) PCT No.: PCT/JP2012/066423
§ 371 (c)(1),
(2), (4) Date: Dec. 18, 2013

(87) PCT Pub. No.: WO2013/002280
PCT Pub. Date: Jan. 3, 2013

(65) Prior Publication Data
US 2014/0133741 A1 May 15, 2014

(30) Foreign Application Priority Data

Jun. 29, 2011 (JP) .................................. 2011-143835

(51) Int. Cl.
*G06K 9/00* (2006.01)
*G06T 15/00* (2011.01)
(Continued)

(52) U.S. Cl.
CPC ............. *G06T 7/0075* (2013.01); *G06T 7/0063* (2013.01); *G06T 17/05* (2013.01); *G06T 2207/10012* (2013.01); *G06T 2207/10032* (2013.01); *G06T 2207/30184* (2013.01)

(58) Field of Classification Search
None
See application file for complete search history.

(56) References Cited

U.S. PATENT DOCUMENTS 6,192,145 B1 * 2/2001 Anandan ................ G06K 9/209
348/E13.008
6,384,859 B1 * 5/2002 Matsumoto .............. G06K 9/20
348/43
(Continued)

FOREIGN PATENT DOCUMENTS

CN 101726255 A 6/2010
CN 101976462 A 2/2011
(Continued)

OTHER PUBLICATIONS

Lhuillier et al., "A Quasi-Dense Approach to Surface Reconstruction from Uncalibrated Images" IEEE Transactions on Pattern Analysis and Machine Intelligence, Vol. 27, No. 3, Mar. 2005, pp. 418-433.*
(Continued)

*Primary Examiner* — Randolph I Chu
(74) *Attorney, Agent, or Firm* — McGinn IP Law Group, PLLC

(57) ABSTRACT

A stereo disparity calculating unit calculates the predicted value of the stereo disparity. A line extracting unit performs line extraction in an image. A line classification unit classifies the extracted lines into different line types. A meaningless line eliminating unit eliminates lines not existing in the real world away from the following processing. A stereo disparity correcting unit corrects the predicted value of the disparity based on the line pairs determined by the line pair determining unit. A line pair clustering unit clusters all the line pairs belonging to the same feature as one cluster. A plane combining unit finds out the location relationship in the three-dimensional space among all the planes of each feature extracted by a plane extracting unit, and generates a three-dimensional model describing the overall structure for each feature.

10 Claims, 31 Drawing Sheets

(51) Int. Cl.
*G06T 17/00* (2006.01)
*G01C 3/14* (2006.01)
*G06T 7/00* (2006.01)
*G06T 17/05* (2011.01)

(56) References Cited

U.S. PATENT DOCUMENTS

| | | | | |
|---|---|---|---|---|
| 7,113,632 | B2* | 9/2006 | Lee | G06K 9/03 348/E13.014 |
| 7,133,551 | B2 | 11/2006 | Chen et al. | |
| 8,467,606 | B2* | 6/2013 | Barton | G06T 7/0083 382/173 |
| 8,508,580 | B2* | 8/2013 | McNamer | H04N 13/0221 348/43 |
| 8,718,393 | B2* | 5/2014 | Chen | G06T 15/205 382/157 |
| 8,810,635 | B2* | 8/2014 | McNamer | H04N 13/021 348/50 |
| 8,885,924 | B2* | 11/2014 | Haglund | G01C 11/06 382/154 |
| 8,933,925 | B2* | 1/2015 | Sinha | G06T 7/0065 345/419 |
| 2004/0041805 | A1 | 3/2004 | Hayano et al. | |
| 2010/0201682 | A1* | 8/2010 | Quan | G06K 9/00704 345/419 |
| 2010/0329543 | A1* | 12/2010 | Li | G06T 3/0068 382/154 |

FOREIGN PATENT DOCUMENTS

| | | |
|---|---|---|
| JP | 2002-074323 A | 3/2002 |
| JP | 2004-102474 A | 4/2004 |
| JP | 2006-286019 A | 10/2006 |
| JP | 2008-082870 A | 4/2008 |

OTHER PUBLICATIONS

Früh et al., "Constructing 3D City Models by Merging Aerial and Ground Views", IEEE Computer Society, 3D Reconstruction and Visualization, Nov./Dec. 2003, pp. 52-61.*

Pollefeys et al., "Detailed Real-Time Urban 3D Reconstruction From Video", Science+Business Media, LLC 2007.*

Zebedin et al. "Fusion of Feature- and Area-Based Information for Urban Buildings Modeling from Aerial Imagery", Springer-Verlag Berlin Heidelberg, ECCV 2008, Part IV, LNCS 5305, pp. 873-886.*

Xiao et al. "Image-based Fac,ade Modeling", ACM Transaction on Graphics (TOG) Proceedings of SIGGRAPH Asia 2008.*

Wonka et al. "Instant Architecture", SIGGRAPH '03 ACM SIGGRAPH 2003 Papers pp. 669-677.*

Schindler et al. "Line-Based Structure From Motion for Urban Environments", Proceeding 3DPVT '06 Proceedings of the Third International Symposium on 3D Data Processing, Visualization, and Transmission (3DPVT'06) pp. 846-853.*

Werner et al., "Model Selection for Automated Architectural Reconstruction from Multiple Views Tom'as Werner, Andrew Zisserman", BMVC 2002: Proceedings of the British Machine Vision Conference, 53-62.*

Debevec et al., Modeling and Rendering Architecture from Photographs: A hybrid geometry- and image-based approach, SIGGRAPH conference proceedings, 1996 ACM-0-89791-746-4/96/008, pp. 11-20.*

Goesel. et al., "Multi-View Stereo for Community Photo Collections", Computer Vision, 2007. ICCV 2007. IEEE 11th International Conference.*

Werner et al., "New Techniques for Automated Architectural Reconstruction from Photographs", Springer-Verlag Berlin Heidelberg 2002, ECCV 2002, LNCS 2351, pp. 541-555.*

Agarwala. et al. "Photographing Long Scenes with Multi-Viewpoint Panoramas", Proceeding SIGGRAPH '06 ACM SIGGRAPH 2006 Papers pp. 853-861.*

International Search Report (ISR) (PCT Form PCT/ISA/210), in PCT/JP2012/066423, dated Sep. 11, 2012.

R. Mohan, R. Nevatia, "Using Perceptual Organization to Extract 3-D Structures", IEEE Transactions on Pattern Recognition and Machine Intelligence, vol. 11, No. 11, pp. 1121 to 1139, Nov. 1989.

T. Dang, O. Jamet, H. Maitre, "Applying Perceptual Grouping and Surface Models to the Detection and Stereo Reconstruction of Building in Aerial Imagery", XVIII Congress of ISPRS, Comm. III, Int. Archives of Photogrammetry and Remote Sensing, vol. 30, pp. 165 to 172, Sep. 1994.

Taichi Oka et al., "Generation of a 3D map based on altitude data", ITE Technical Report 2003 Nen 3 Gatsu Kaisaibun, Mar. 18, 2003, vol. 27, No. 21, pp. 5 to 8.

Chinese Office Action with Search Report dated Jul. 28, 2015 with an English translation thereof.

R. Mohan, et al., "Using Perceptual Organization to Extract 3-D Structures", Transactions on Pattern Recognition and Machine Intelligence, vol. 11, issue 11, pp. 1121-1139, Nov. 30, 1989.

A.W.K. Tang, et al., "Projective Reconstruction from Line-Correspondences in Multiple Uncalibrated Images", Pattern Recognition, vol. 39, Issue 5, pp. 889-895, May 31, 2006.

Lingjun Zhao, "Building Extraction from High Resolution SAR Imagery", Database for Chinese Doctoral Dissertations, Apr. 15, 2010.

T. Dang, et al., "Applying Perceptual Grouping and Surface Models to the Detection and Stereo Reconstruction of Building in Aerial Imagery", XVIII Congress of ISPRS, Comm. III, Int. Archives of Photogrammetry and Remote Sensing, vol. 30, pp. 165-172, Sep. 30, 1994.

Wei Shen, et al., "Algorithms Study of Building Boundary Extraction and Normalization Based on Lidar Data", Journal of Remote Sensing, vol. 12, issue 5, pp. 692-698, Sep. 30, 2008.

Feng Meng, et al., "Extraction of Buildings' Feature Lines Based on LIDAR Point Clouds", Science of Surveying and Mapping, vol. 33, issue 5, pp. 97-99, Sep. 30, 2008.

Guang Chen, "Identification and Variation Detection of Buildings in Remote Sensed Images", (Master) Collection of Information Science and Technology in Full-Text Database for Chinese Outstanding Doctoral and Master Dissertations, pp. 140-316, Nov. 15, 2005.

* cited by examiner

FIG. 5
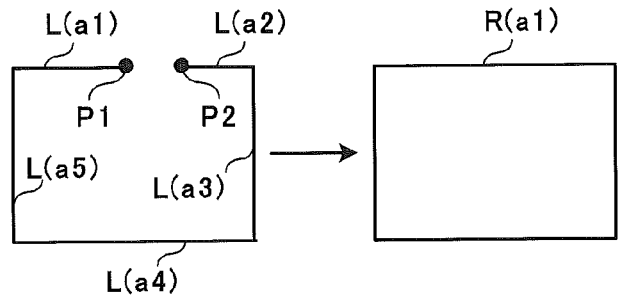
(a)
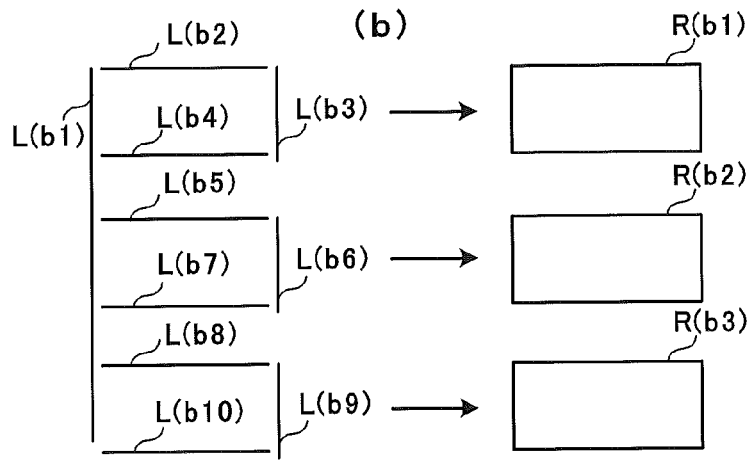
(b)
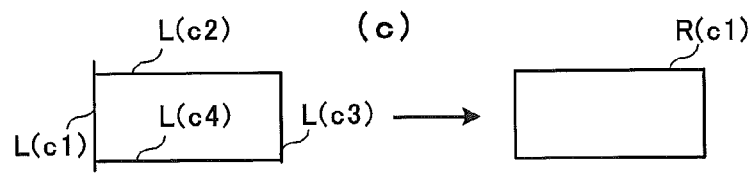
(c)
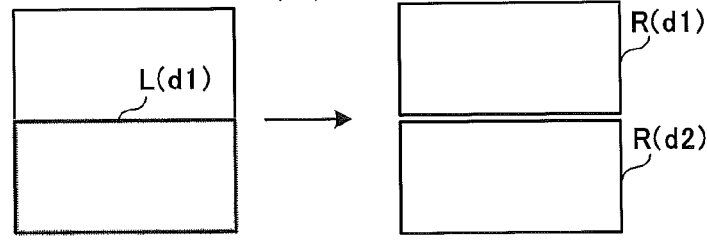
(d)
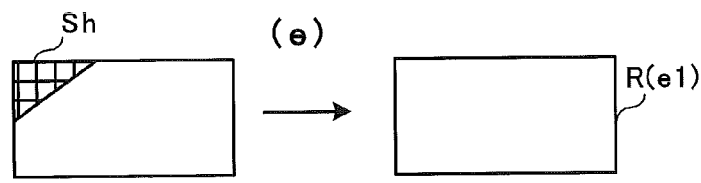
(e)

DEVICE FOR GENERATING THREE DIMENSIONAL FEATURE DATA, METHOD FOR GENERATING THREE-DIMENSIONAL FEATURE DATA, AND RECORDING MEDIUM ON WHICH PROGRAM FOR GENERATING THREE-DIMENSIONAL FEATURE DATA IS RECORDED

TECHNICAL FIELD

The present invention relates to a device for generating three-dimensional feature data, a method for generating three-dimensional feature data, and a recording medium on which a program for generating three-dimensional feature data is recorded that are capable of generating highly precise three-dimensional feature data reflecting the detailed rooftop structure at low costs.

BACKGROUND ART

A conventional technology of generating three-dimensional model of features (natural or artificial all the terrestrial objects) is known as the technology that takes three-dimensional point cloud data of the land surface obtained through an aerial laser scanner as the input data and classifies it into two parts, i.e. features and the ground based on their different frequency characteristics, and then calculates three-dimensional geographical coordinates of the contour polygon of each feature obtained from the classification, thereby generating three-dimensional model of all the features.

Patent Literature 1 discloses, as an example of the above stated technology, the method and system of generating three-dimensional urban spatial model by utilizing the data from laser scanner.

According to the technologies disclosed in Patent Literature 1, in general, the generated three-dimensional feature model is rough due to the limited resolution of laser data, and in this case there is a disadvantage that, in particular, the rooftop structure of a feature cannot be expressed highly precisely. For example, the rooftop part of a three-dimensional feature model generated based on laser data with the resolution of 1 m cannot express the details of the rooftop structure of an actual building.

In recent years, new technologies appear by generating digital surface model (DSM) at the same resolution as the input high-resolution stereo pair of aerial photographs, which enables the generation of finer three-dimensional data than laser data, and also finer expression of the rooftop structure of features. Moreover, the cost of aerial photogrammetry is lower than that of laser data.

Moreover, Patent Literature 2 discloses a technology of firstly taking images of buildings on the ground, while at the same time recording the longitude and latitude of the location where the images are taken, and then allowing an operator to specify the vertices of the structural planes of the building, finally calculating the three-dimensional coordinates of the specified vertices based on the images and the GPS information, thus generating a three-dimensional model of the building.

According to the technology of Patent Literature 2, a lot of manual works for each building is necessary, such as image shooting, vertices specification, etc., and thus the costs become large especially in the case of, for example, a broad residential street with high density of residential buildings. In addition, the image shooting on the ground has some limitations, such that a tall building in an urban district cannot be processed.

Under such circumstances, for example, Non-patent Literature 1 discloses a three-dimensional reconstruction technology to generate three-dimensional models of features by using the stereo pair of aerial photographs.

Non-patent Literature 1 discloses a technology of firstly detecting lines from the stereo pair of aerial photographs, secondly extracting line groups with special geometrical relationship like parallel or vertical relationship through a technology called perceptual grouping by analyzing the geometrical relationship between a line and its neighboring lines both in left and right images of the stereo pair, subsequently extracting features with rectangular contour, and thirdly obtaining the three-dimensional coordinates of the feature contour by stereo matching, thereby generating the three-dimensional model of all the features.

In addition, Non-patent Literature 2 discloses a technology similar to the technology in Non-patent Literature 1, that collects only edges associated with each feature through perceptual grouping to get the contour of each rectangular building, and obtains three-dimensional building model based on disparity map calculated in advance by stereo matching.

CITATION LIST

Patent Literature

Patent Literature 1: Unexamined Japanese Patent Application Kokai Publication No. 2002-074323
Patent Literature 2: Unexamined Japanese Patent Application Kokai Publication No. 2004-102474

Non Patent Literature

Non-patent Literature 1: R. Mohan, R. Nevatia, "Using Perceptual Organization to Extract 3-D Structures", IEEE Transactions on Pattern Recognition and Machine Intelligence, vol. 11, no. 11, pp. 1121 to 1139, November 1989.
Non-patent Literature 2: T. Dang, O. Jamet, H. Maitre, "Applying Perceptual Grouping and Surface Models to the Detection and Stereo Reconstruction of Building in Aerial Imagery", XVIII Congress of ISPRS, Comm III, Int. Archives of Photogrammetry and Remote Sensing, Vol. 30, pp. 165 to 172, September 1994.

SUMMARY OF INVENTION

Technical Problem

The above-explained conventional technologies have the following disadvantages.

The technologies like that in Patent Literature 1 as an example have a disadvantage that it is difficult for such a technology to reflect the fine structure on the rooftop of a feature (i.e. a building, an architectural structure, and the like) in the image.

This is because highly precise rooftop information is unobtainable due to the limited resolution of laser data as explained above.

The technologies like that in Patent Literature 2 as an example need high labor costs especially when processing a residential street with high density of buildings, and are also unable to process a tall building due to the limitation of image shooting on the ground.

Hence, in order to process various buildings in the broad area, it is necessary to generate three-dimensional data based on aerial photographs or satellite images.

The technologies like those in Non-patent literatures 1 and 2 are only capable of generating the three-dimensional model of features with simply shaped contour (for example, a rectangular rooftop) through perceptual grouping. However, there will be problems for perceptual grouping when the number of extracted lines is extremely high in the case of a residential street with high density of residential buildings. Moreover, since most residential buildings in the same street block are often built in the same direction parallel to a road, the number of lines in the parallel relationship and in the vertical relationship with each extracted line of a residential building become remarkably large, and thus it is difficult to extract the contour of each residential building only based on the simple geometrical relationship. In addition, in the case of a tall building, the disparity is extremely large, and thus there is a disadvantage that a pair of corresponding lines respectively in right and left images cannot be found out but are respectively wrongly associated with other lines.

The present invention has been made in order to address such disadvantages, and it is an objective of the present invention to enable the generation of highly precise three-dimensional feature data that reflects the detailed rooftop structure at low costs.

Solution to Problem

A first exemplary aspect of the present invention provides a three-dimensional feature data generating device that generates three-dimensional data of a feature, i.e. a residential building, an architectural structure and the like, from stereo images, and the three-dimensional feature data generating device includes:

a stereo disparity calculating unit that calculates predicted value of stereo disparity relating to height information of the terrain and all the features;

a line extracting unit that extracts the lines from an image, which are characteristic lines representing the internal structure of the rooftop of each feature, contour lines representing the external shape of each feature, and characteristic lines of each non-feature object;

a line classification unit that classifies the lines extracted by the line extracting unit into three classes according to their respective meaning in the real world, i.e., the internal rooftop lines of features, external contour lines of features, and contour lines of shadow areas;

a meaningless line eliminating unit that eliminates the lines that do not exist in the real world but are generated due to the influence of shadow or image noise;

a line pair determining unit that determines, for each line in one image of the stereo image pair, its corresponding line in another image of the stereo image pair, based on the disparity information from the stereo disparity calculating unit, the color and texture distribution patterns of the neighboring region around each line, and also the line classification result;

a stereo disparity correcting unit that calculates more precise disparity value based on the correspondence relationship of each line pair obtained by the line pair determining unit, to correct the predicted stereo disparity value obtained by the stereo disparity calculating unit;

a line pair clustering unit that firstly selects, among all the line pairs obtained by the line pair determining unit, only the line pairs related to features including a residential building, an architectural structure and the like, and then utilizes both the disparity information of each line pair and the geometrical relationship of several line pairs to finally cluster the line pairs belonging to the same feature as one line pair cluster;

a plane extracting unit that extracts basic planes configuring a feature based on the geometrical relationship and disparity information of the line pairs in each line pair cluster obtained by the line pair clustering unit; and a plane combining unit that calculates the three-dimensional relative location relationship between the planes of each feature extracted by the plane extracting unit to generate a three-dimensional model representing the whole structure of each feature.

A second exemplary aspect of the present invention provides a three-dimensional feature data generating method for generating three-dimensional data of a feature, i.e. a residential building, an architectural structure and the like, from stereo images, and the three-dimensional feature data generating method includes:

a stereo disparity calculating step for calculating predicted value of stereo disparity relating to height information of the terrain and all the features;

a line extracting step for extracting the lines from an image, which are characteristic lines representing the internal structure of the rooftop of each feature, contour lines representing the external shape of each feature, and characteristic lines of each non-feature object;

a line classification step for classifying the lines extracted through the line extracting step into three classes according to their respective meaning in the real world, i.e., the internal rooftop lines of features, external contour lines of features, and contour lines of shadow areas;

a meaningless line eliminating step for eliminating the lines that do not exist in the real world but are generated due to the influence of shadow or image noise;

a line pair determining step for determining, for each line in one image of the stereo image pair, its corresponding line in another image of the stereo image pair, based on the disparity information from the stereo disparity calculating step, the color and texture distribution patterns of the neighboring region around each line, and also the line classification result;

a stereo disparity correcting step for calculating more precise disparity value based on the correspondence relationship of each line pair obtained through the line pair determining step, to correct the predicted stereo disparity value obtained through the stereo disparity calculating step;

a line pair clustering step for firstly selecting, among all the line pairs obtained through the line pair determining step, only the line pairs related to features including a residential building, an architectural structure and the like, and then utilizing both the disparity information of each line pair, and the geometrical relationship of several line pairs to finally cluster the line pairs belonging to the same feature as one line pair cluster;

a plane extracting step for extracting basic planes configuring a feature based on the geometrical relationship and disparity information of the line pairs in each line pair cluster obtained through the line pair clustering step; and a plane combining step for calculating the three-dimensional relative location relationship between the planes of each feature extracted through the plane extracting step to generate a three-dimensional model representing the whole structure of each feature.

A third exemplary aspect of the present invention provides a recording medium having stored therein a three-dimensional feature data generating program that causes a computer to function as:

a stereo disparity calculating unit that calculates predicted value of stereo disparity relating to height information of the terrain and all the features;

a line extracting unit that extracts the lines from an image, which are characteristic lines representing the internal structure of the rooftop of each feature, contour lines representing the external shape of each feature, and characteristic line of each non-feature object;

a line classification unit that classifies the lines extracted by the extracting unit into three classes according to their respective meaning in the real world, i.e., the internal rooftop lines of features, external contour lines of features, and contour lines of shadow areas;

a meaningless line eliminating unit that eliminates the lines that do not exist in the real world but are generated due to the influence of shadow or image noise;

a line pair determining unit that determines, for each line in one image of the stereo image pair, its corresponding line in another image of the stereo image pair, based on the disparity information from the stereo disparity calculating unit, the color and texture distribution patterns of the neighboring region around each line, and also the line classification result;

a stereo disparity correcting unit that calculates more precise disparity value based on the correspondence relationship of each line pair obtained by the line pair determining unit, to correct the predicted stereo disparity value obtained by the stereo disparity calculating unit;

a line pair clustering unit that firstly selects, among all the line pairs obtained by the line pair determining unit, only the line pairs related to features including a residential building, an architectural structure and the like, and then utilizes both the disparity information of each line pair and the geometrical relationship of several line pairs to finally cluster the line pairs belonging to the same feature as one line pair cluster;

a plane extracting unit that extracts basic planes configuring a feature based on the geometrical relationship and disparity information of the line pairs in each line pair cluster obtained by the line pair clustering unit; and a plane combining unit that calculates the three-dimensional relative location relationship between the planes of each feature extracted by the plane extracting unit to generate a three-dimensional model representing the whole structure of each feature.

Advantageous Effects of Invention

According to the present invention, it becomes possible to generate highly precise three-dimensional feature data that reflects the detailed rooftop structure at low costs.

BRIEF DESCRIPTION OF DRAWINGS

FIG. 5A is an exemplary diagram for explaining a specific example of line pair clustering;

FIG. 5B is an exemplary diagram for explaining a specific example of line pair clustering;

FIG. 5C is an exemplary diagram for explaining a specific example of line pair clustering;

FIG. 5D is an exemplary diagram for explaining a specific example of line pair clustering;

FIG. 5E is an exemplary diagram for explaining a specific example of line pair clustering;

DETAILED DESCRIPTION OF PREFERRED EMBODIMENTS

The embodiments of the present invention will be described below with reference to the accompanying drawings.

The following embodiments are merely to illustrate the present invention, and are not intended to limit the scope and spirit of the present invention. Hence, those skilled in the art can employ embodiments in which each or all of the structural components of the following embodiments are replaced with equivalents, and such embodiments are also within the scope and spirit of the present invention.

(First Embodiment)

Figure 1:
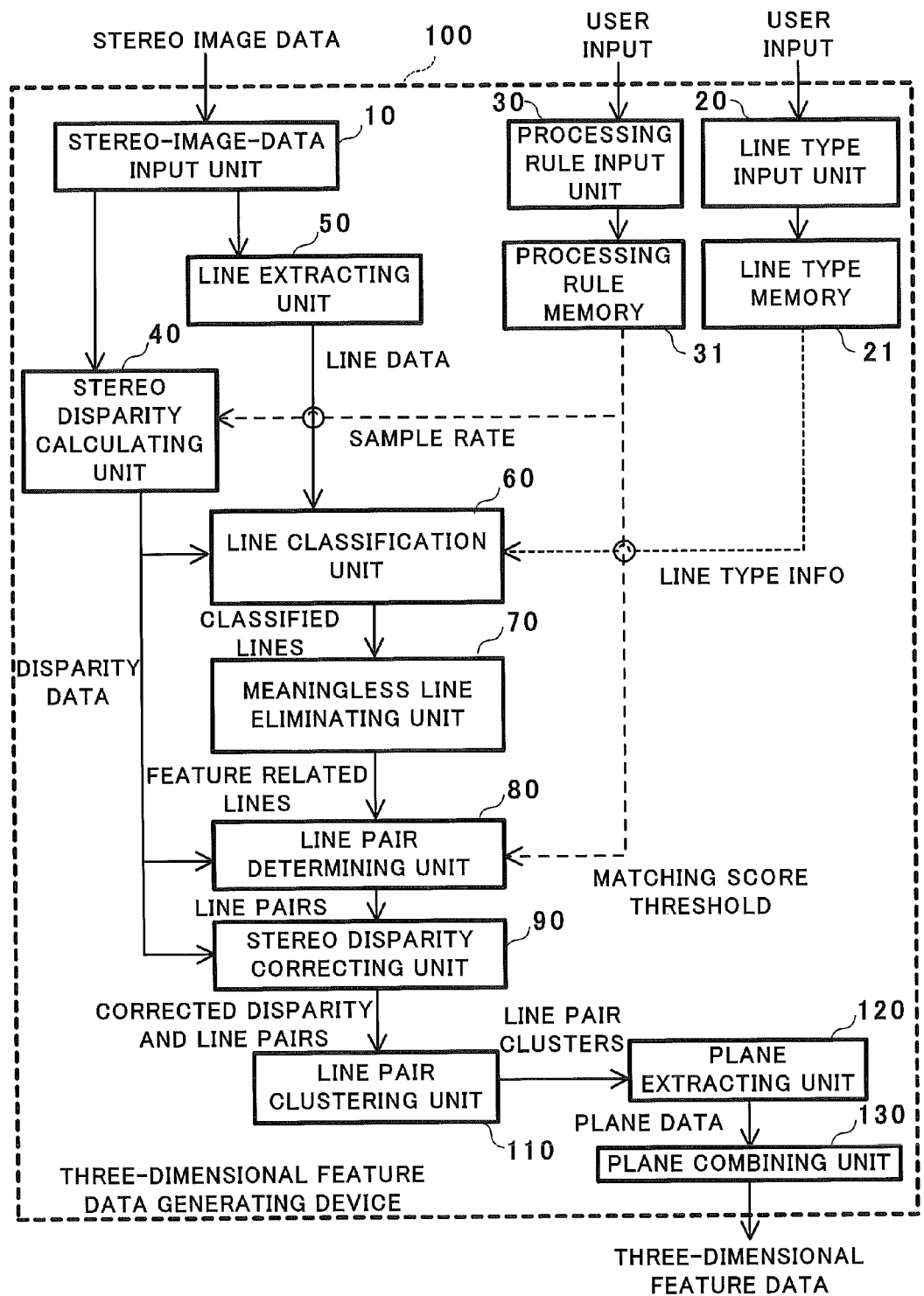
FIG. 1 is a block diagram illustrating the general structure of a three-dimensional feature data generating device according to a first embodiment.

FIG. 1 is a block diagram illustrating the general structure of a three-dimensional feature data generating device 100 according to a first embodiment of the present invention. The three-dimensional feature data generating device 100 generates three-dimensional model of features including residential buildings, architectural structures and the like, based on stereo information from several images taken from the sky at different viewpoints towards the same land area containing features (i.e. residential buildings and architectural structures and the like), and line information of the features. The following explanation will be given with reference to this figure.

As illustrated in FIG. 1, the three-dimensional feature data generating device 100 includes a stereo image data input unit 10, a line type input unit 20, a line type memory 21, a processing rule input unit 30, a processing rule memory 31, a stereo disparity calculating unit 40, a line extracting unit 50, a line classification unit 60, a meaningless line eliminating unit 70, a line pair determining unit 80, a stereo disparity correcting unit 90, a line pair clustering unit 110, a plane extracting unit 120, and a plane combining unit 130.

The stereo image data input unit 10 has the function of inputting image data. The user inputs a pair of images having stereo information, i.e. stereo images, including a left image and a right image through the stereo image data input unit 10.

The example stereo images utilized in the present invention are digital images converted from aerial photographs, or satellite photos, or the like, but not limited to those. In particular, in the case of aerial photograph, stereo images may be digital images obtained by digitalizing analog photographs from an analog camera through scanning or the like.

As an example, when the stereo images are aerial photographs, stereo aerial photographs might be taken with standards of an endlap of 60% between two adjacent shootings on a flight line and a sidelap of 30% between two adjacent flight lines.

The line type input unit 20 has the function of inputting the line types in the stereo images to be processed. The user inputs all the necessary line types for classifying each line in the stereo images through the line type input unit 20.

For example, the line type input unit 20 may provide all the possible types of lines usually existing in an aerial photograph. Next, the user selects the line types appearing in current aerial photograph to be processed and inputs them through the line type input unit 20. The line types input through the line type input unit 20 are stored in the line type memory 21, and are obtained when they are required in the line classification unit 60 to determine the line type for each line.

The following are example line types existing in an aerial photograph, such as a contour line of a shadowed area, an external contour line of a building, an internal rooftop line of a building, a road line, a line in a parking lot, a noise line on the water surface, a noise line on a tree, and other noise lines. Such line types can be input through the line type input unit 20 respectively as independent line type, or can be input as a new line type by combining multiple types. For example, the external contour line of a building, the internal rooftop line of a building may be combined as a new type called a contour line of a building. Moreover, the noise line on the water surface, the noise line on a tree, and other noise lines may be combined as a new type called a noise line. Furthermore, the road line, the line in a parking lot may be combined as a new type called a ground line.

Figure 2:
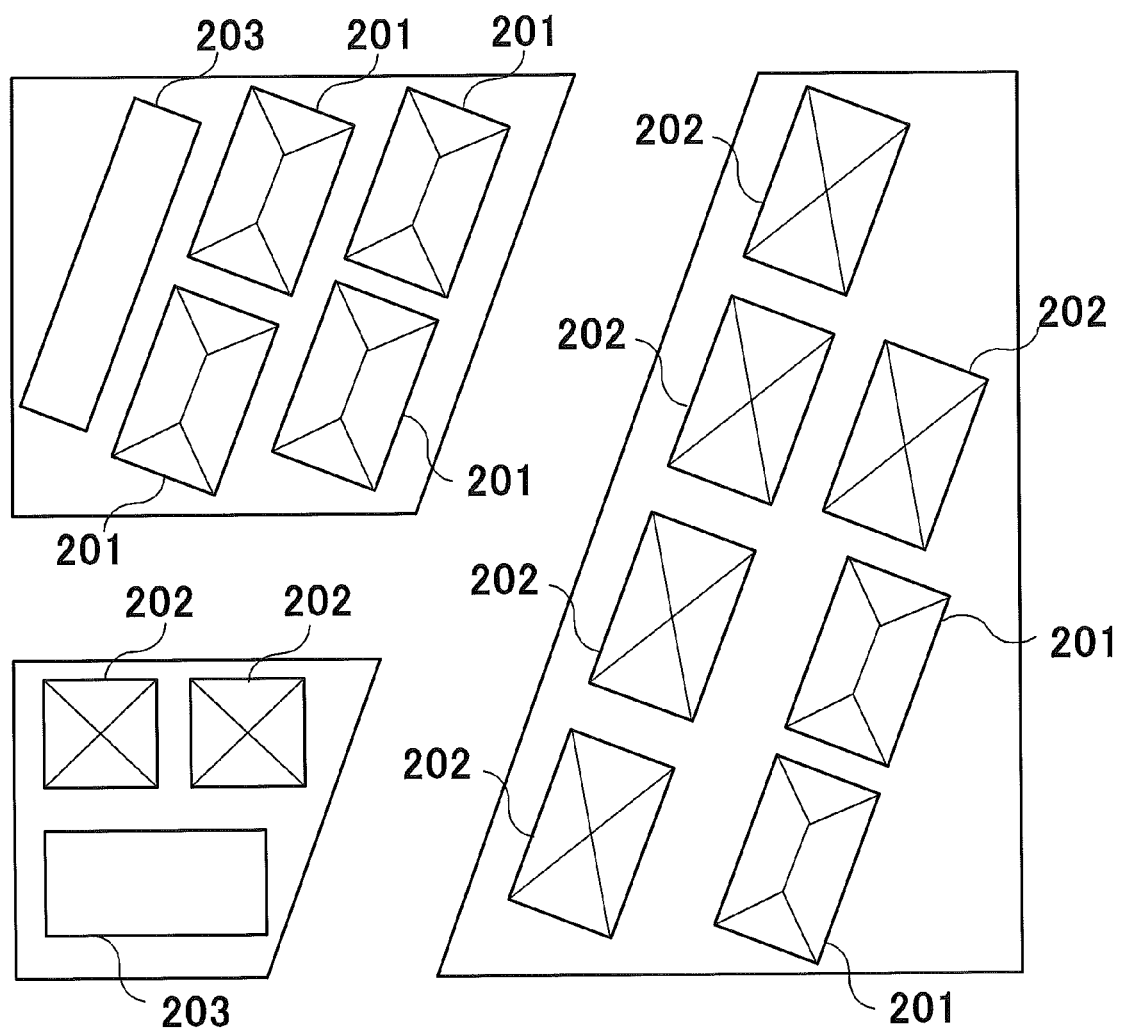
FIG. 2 is an exemplary diagram illustrating an example of the contour lines of residential buildings closely located.

In practice, the fineness of the line type set is determined in accordance with the contents of the processing photo, and the characteristics of the terrain and the features in the photo. As an example, as illustrated in FIG. 2, when closely locating residential buildings have similar structure to each other, in order to determine the relationship of line pairs more precisely, it is better to set two line types, i.e. the external contour line of a building and the internal rooftop line of a building, than only one line type as a contour line of a building.

Moreover, the line type set can be determined in accordance with practical application and purpose. More specifically, for example, the whole 180 degree range is evenly divided into six parts thus obtaining six line types depending on the angle of a line. In addition, when the rooftop structure of a feature (including residential building, architectural structure, and the like) are comprised of polygons, the lines on building contours may be classified into different line types according to the line direction. In this way, the line pair determining process and the line pair clustering process to be discussed later can be more easily implemented.

The other examples will also be explained. For example, by converting the map of the same area as the aerial photograph so as to register the map to the aerial photograph, the range information of street blocks on the map is reflected on the image, and the lines can be then classified by each street block. That is, all the lines in the same street block are classified as the same line type, thereby decreasing the search range of candidate corresponding lines to be discussed later.

Moreover, any new line type set built based on a combination of various line type sets is also applicable.

Returning to FIG. 1, the processing rule input unit 30 has the function of inputting all the parameters associated with the generation of three-dimensional feature data. The user inputs into the processing rule input unit 30 the necessary parameters respectively for the stereo disparity calculating process and the line pair determining process to be discussed later.

The parameters input through the processing rule input unit 30 include, for example, a sample rate for down-sampled stereo images during the calculation of stereo disparity, and a matching score threshold for determining line pairs.

The parameters input through the processing rule input unit 30 are stored in the processing rule memory 31. The parameters are respectively obtained from the processing rule memory 31 when they are required in the stereo disparity calculating process and the line pair determining process.

The stereo disparity calculating unit 40 calculates the stereo disparity of all the features in the overlapping region of stereo aerial photographs. For the same feature, the parallax effect makes the same feature appear different in the left and right images and such difference reflects the altitude information.

In order to obtain the disparity, it is necessary to firstly find out the corresponding regions in the left and right aerial images. For the two stereo images, stereo matching is performed to obtain the correlation of regions in the right and left images.

In the stereo matching process, in the overlapping area of the left and right images, the similarity of respective region in the right and left images is calculated through certain calculation technique. This similarity indicates the possibility of the two regions respective from the right and left images to correspond with each other.

Color information or grayscale information of each pixel in the image may be directly utilized during the similarity calculation. In addition, it is also possible to firstly perform image segmentation and then calculate the similarity for each segment. The similarity may also be calculated based on typical image features, such as feature points, feature lines, and feature curves.

The relative orientation should be performed on the right and left images before stereo matching, decreasing the search range of corresponding pixel or region from two-dimension to one-dimension. That is, after relative orientation, the corresponding pixel in another image of the image pair only exists on the same epipolar line.

The disparity obtained through the stereo disparity calculating unit 40 is still the predicted value of the actual disparity, and will be corrected afterwards by the stereo disparity correcting unit 90 based on line pair information as will be discussed later. The disparity correctable by the stereo disparity correcting unit 90 is the matching noise produced due to image noise, while the disparity information in an occlusion area cannot be corrected since the necessary information is lost in current image pair.

Moreover, the disparity obtained through the stereo disparity calculating unit 40 is not an actual altitude, but is merely relative height information proportional to the actual altitude. Since the disparity reflects the relative height of features, the disparity is utilized as auxiliary information in the line pair determining process and the line pair clustering process to be discussed later.

On the final result of a three-dimensional model, the height of a feature may be the disparity value simply proportional to the actual altitude, or the actual altitude converted from the disparity based on the shooting information of the input aerial photographs.

In the stereo disparity calculating unit 40, besides the technique of directly calculating the disparity based on the stereo images in the original size, other techniques are also applicable. For example, it is possible to calculate the disparity on the down-sampled stereo images at certain sample rate for certain specific purposes, and then to map the obtained disparity to the image in the original size, thereby to obtain the disparity of the whole image.

When the right and left images are down-sampled at the same sample rate, optimized corresponding points from wider search range can be obtained in more efficient way than the case of the stereo images in the original size. In particular, when the possible searching range is wide to obtain the disparity in the stereo images, that is, when the terrain changes greatly, it is more efficient and precise to calculate the disparity by this technique.

In the actual aerial photograph, there are various cases for greatly changing terrain. For example, in the case of a mountain area, there are both large positive disparity and large negative disparity. And in the case of a tall building in an urban district, there is an extremely large positive disparity in comparison with the average disparity in the image. In such cases of wide range of the possible value of the disparity, if the stereo disparity is directly calculated in the original image size, it is hard to achieve a good balance between calculation time and accuracy.

When the goal of the application is to obtain precise disparity on each pixel through the whole image, it is necessary to perform calculation for all the pixels with the searching range from the lowest negative disparity to the highest positive disparity. In this case, the processing time inevitably becomes long.

Conversely, when the goal of the application is to achieve good calculation efficiency, by setting the searching range of each pixel as the average searching range of the whole image, the processing time can be reduced in comparison with the case of having the searching range from the lowest negative disparity to the highest positive disparity in the image. However, in this way, it is not possible to obtain correct disparity for a pixel having extremely high positive disparity or extremely low negative disparity since it is out of the average searching range, and thus these pixels look like pixels in occlusion region due to the failure of correct matching.

In order to address the above disadvantages, some conventional technologies appear, by setting the average searching range on the whole image to calculate the disparity firstly, and then enlarging the searching range manually to a certain degree only for mismatched pixels and performing stereo matching again on these pixels. By this technique, disparity information of the whole image can be obtained correctly at certain efficiency, but the technique is not automatic since the manual setting by the user is necessary. Moreover, in order to set the enlarged searching range, the knowledge of all the possible disparity values in the image is necessary.

Figure 3:
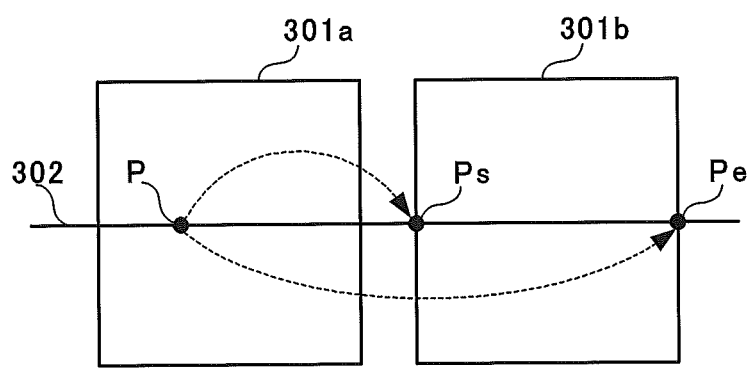
FIG. 3 is an exemplary diagram for explaining the search range of stereo matching over the down-sampled stereo images.

In contrast, according to the present invention, by performing stereo matching on down-sampled stereo images, the disparity of all the pixels can be obtained automatically and efficiently. More specifically, as illustrated in FIG. 3, the searching range is set as the width of the image on the down-sampled stereo images. That is, with respect to a point P in left image 301*a*, the similarity of it to each point from Ps to Pe on the same epipolar line 302 in right image 301*b* is calculated, and the point having the highest similarity among those points is set as the corresponding point of point P. In this case, since the searching range is the width of the down-sampled image, besides for the real occlusion points, both the maximum positive disparity and the minimum negative disparity can be obtained correctly. Moreover, though the searching range is the width of the image, since the calculation is performed on the down-sampled image, the larger the sample rate is, the more the processing time is reduced.

When mapping the disparity obtained from the down-sampled stereo images to the images in the original size, the larger the sample rate is, the larger the number of pixels having unknown disparity information in the images of the original size is. An explanation will be given as an example here. When the number of pixels in the image of the original size is N, and the sample rate is 2, the number of the pixels with unknown disparity information is $(1-0.5\times0.5)\times N=0.75\times N$. And when the sample rate is 10, the number of pixels with unknown disparity information is $(1-0.1\times0.1)\times N=0.99\times N$.

When there is a demand for not only the high efficiency but also the high precision, the disparity obtained on the down-sampled images is not directly mapped to the images of the original size but utilized as auxiliary information for stereo matching of the stereo images of the original size. More specifically, firstly, for a pixel with known disparity information in the image of original size, a searching range centered at the known disparity is set, and more precise disparity is then calculated within such a range. Next, during the process of obtaining the disparity for the pixels with unknown disparity information, the already calculated disparity information can be also utilized as search restriction. In this way, an appropriate searching range for each pixel can be set automatically and efficiently.

It is desirable that such a sample rate should be set in the practical application that both efficiency and precision are achieved. When a demand for the efficiency is higher, a relatively large sample rate scale is set. Conversely, when a demand for the precision of the disparity is higher, a relatively small sample rate is set. Moreover, the setting of the sample rate is also relevant to the image contents. For example, in the case of gradually changing terrain without many features, the precision of overall disparity is not influenced so much even if a large sample rate is set. Conversely, in the case of densely locating features, in order to get more precise three dimensional data to reflect the fine contents on the image, it is better to set a small sample rate.

Returning to FIG. 1, the line extracting unit 50 processes the right and left images of the stereo images, respectively, firstly extracts edges in the image, and then extracts lines based on the edges.

There are various techniques for edge extraction and line extraction, but there is no limitation for using any particular ones in this embodiment.

For example, a Canny extraction technique is applicable for edge extraction.

In addition, a Hough transform technique is applicable for line extraction.

The line classification unit 60 processes the right and left images of the stereo images respectively, and classifies all the lines in an image into various line types based on the line type information desired to be applied to current stereo images input through the line type input unit 20.

The applied line type set may be one specific set, or a combination of several line type sets. It is desirable to utilize the line type set to be applied in accordance with the image contents. For example, a line type set with respective line type for each street block is applicable to a residential street without tall buildings. Since large positive disparity exists in the case of tall buildings, it is probable that the corresponding line of its rooftop contour appears in a different street block in the other image of the stereo image pair.

The line classification unit 60 classifies all the lines in the image into different types based on the line type information input through the line type input unit 20. Here the line classification unit 60 utilizes the characteristics of lines for classification, such as the angle, the location, the length, the disparity obtained from the stereo disparity calculating unit 40, and also the characteristics of stereo images.

Various techniques of line classification are applicable based on the classification standards and the characteristics utilized in classification but there is no limitation for using any particular one in this embodiment. As an example, one applicable classification technique is explained below.

It is possible to grasp the average disparity on a line and the change of disparity on the direction of the line based on the disparity information on the line and its neighboring region. With the disparity threshold to distinguish the ground and the building, the lines with average disparity under the threshold are classified as lines unrelated to a feature, i.e. a building or an architectural structure. The remaining lines are then further classified into two types, i.e. noise lines on trees and lines related to features, based on the line length, the smoothness of the color or texture distribution pattern in the neighboring region of the line. However, when the terrain changes greatly in the whole image, or when the height of features is various, it is necessary to set adaptive threshold for different regions of the image.

The line classification unit 60 further classifies the lines related to features into external contour line of buildings and internal rooftop line based on the disparity information and the characteristics of the image. When the disparity on both sides of a line are largely different and so is the color distribution patterns on both sides, the line classification unit classifies this line as an external contour line of buildings. Conversely, regardless of the difference of the disparity on two sides of the line, if the respective average disparity, calculated in neighboring region in the direction perpendicular to the line, is approximately same on left and right side of the line, and the color distribution patterns in the neighboring regions respectively on left and right side are also similar, with only slight difference in brightness, the line classification unit classifies this line as an internal rooftop line.

Though the lines unrelated to features are not directly used to generate the three-dimensional model of a feature, in order to facilitate the line pair determining process on lines related to features and also the line pair clustering process, the lines unrelated to features may be further classified. For example, a shadow area can be detected based on the color characteristic of the image, and then the contour line of the shadow area is distinguishable from other lines. There is always a feature, such as a residential building or an architectural structure, near a shadow area. In addition, the lines extracted along the white line on the road are marked as road lines, and then used in determining the range of street blocks by obtaining the intersecting relationship among road lines. When there is no map information, such a technique can be applied to obtain the range of street blocks.

Furthermore, the color characteristics and texture characteristics of the image and the texture characteristics of the disparity can be utilized to extract, for example, a water surface, and all the lines within the water area are classified as noise lines on the water surface. Moreover, it is also possible to detect a water area and a green space based on the map data.

Classifying lines into several line types makes it easier to carry out line pair determining process, meaningless line eliminating process and line pair clustering process to be discussed later.

By classifying corresponding lines respectively in the right and left images into the same line type, for a line in one image, when searching for its corresponding line in another image during the line pair determining process, the search range can be limited to lines of the same line type as the current processing line.

Moreover, the line type information of each line is also useful during the line pair clustering process when deciding whether a line pair belongs to a feature or not. For example, the line pairs in the same street block probably belong to the same building, and thus the line pairs in the same street block are preferentially considered as one line pair cluster during line pair clustering.

Furthermore, line classification also makes line eliminating process to be discussed later more efficient. For example, when lines are already classified as lines related to features or lines unrelated to features, lines unrelated to features can be simply eliminated. Moreover, when all the lines are already classified into different line types for each street block area, except the lines in the street block to be processed, the other lines can all be eliminated as meaningless lines.

The meaningless line eliminating unit 70 marks all the lines that will not be processed in the following processes, such as the line pair determining process, and the line pair clustering process as meaningless lines and eliminates them, thereby improving the efficiency and the accuracy of the later processes.

In practice, the definition of meaningless lines changes depending on the specific application. For example, when the application is only carried out on buildings equal to or larger than certain size, a threshold on the line length can be applied to mark all the lines shorter than this threshold as meaningless lines.

In the meaningless line eliminating unit 70, when one line type is determined as meaningless, it is possible to eliminate multiple lines of this line type based on the result of the line classification unit 60. Basically, except lines related to features, the other lines are all determined as meaningless and then eliminated, so as to facilitate the following processes.

For example, all the lines are already classified into the following types, external contour line of features, internal rooftop line of features, road line, contour line of shadow areas, tree noise line, and water surface noise line. Under this circumstance, the contour line of shadow area from one image of the stereo pair has no corresponding line in the real world in another image of the stereo pair, and thus such a line should be eliminated. Moreover, the tree noise line, and the water surface noise line are distributed randomly in both right and left images, and thus such lines have no corresponding lines in the real world and therefore should also be eliminated.

Though road lines are useful for determining street block areas, when the information of street blocks is already available, such lines are not used for generating the three-dimensional model of a feature in the later process, and thus should also be eliminated.

For all the remaining lines after eliminating meaningless lines, the line pair determining unit 80 finds, with respect to each line in one image, its corresponding line in the other image of the stereo image pair.

During the search of the corresponding line, the line classification result is firstly utilized, by selecting the lines of the same line type as current processing line and calculating the matching score of each candidate corresponding line with current processing line.

Moreover, during the search of the corresponding line, the disparity obtained through the stereo disparity calculating unit 40 can also be utilized. More specifically, based on the disparity on each pixel of the currently processing line, the pixel in another image corresponding to each pixel is obtained. Next, lines in the neighboring region of the set of the corresponding pixels are found as candidate corresponding lines, and the matching score of each candidate corresponding line with the current processing line is calculated. Subsequently, the corresponding line is determined based on the matching scores.

By utilizing the disparity information to get the candidate corresponding lines, both the accuracy and the efficiency of line pair determining are improved, especially in the cases unsolved by conventional techniques (for example, an area where residential buildings with similar colors and similar heights are densely distributed or an area with a tall building).

When a matching score is calculated between the current processing line and the candidate corresponding line respectively from right and left images, various characteristics can be utilized. For example, the matching score may be calculated based on the combination of the similarities on the following characteristics, such as the color or the texture distribution patterns on both sides of the line, the line angle, and the line length.

According to conventional techniques, the threshold of matching score is used to determine a line pair having matching score equal to or greater than the threshold as corresponding lines, while the pairs with scores under the threshold are all determined as mismatched lines. This leads to many false matching pairs especially in the area with densely distributed buildings since the number of lines in such an area is large and also the lines nearby may have similar disparity.

In order to address this disadvantage, according to the present invention, a step-by-step matching is applied. The correspondence relationship of a line pair with highest credibility is firstly set, which can be utilized as the constraint for the following matching process. Subsequently, the line pair having the highest credibility among the left line pairs is decided as corresponding lines, which can be utilized as the constraint for the following matching process too, together with all the formerly decided corresponding line pairs. The overall credibility of the correspondence relationship of all the possible corresponding line pairs can be improved through such a step-by-step process.

The credibility of the line correspondence relationship is not limited to the characteristics utilized in this embodiment, but may be defined based on various characteristics. For example, the matching score, the line length, and the disparity. By using those characteristics, the correspondence relationship of the line pair with high matching score is firstly decided and thus false matching pairs can be reduced. In general, since there are usually few large features in the image, deciding the correspondence relationship of long line pairs can also reduce false matching pairs. And in conventional techniques, a corresponding line is always simply searched in the neighboring region of current processing line. Hence, it is difficult to find the corresponding line for the contour line of a tall building. In order to address this disadvantage, the correspondence relationship of the line pairs of a tall building are firstly set based on the disparity information. Accordingly, the false matching pairs relating to the tall building are avoided, and the false matching pairs of the contour line of other buildings near the tall building are also reduced.

An explanation will be given below as an example to clarify the technique of setting correspondence relationship of lines in the right and left images.

The aim is to search for the corresponding line in the other image for a line in one image. For example, the line Sr1 in the right image is determined as the corresponding line to a line Sl1 in the left image, while the line Sl2 in the left image is determined as the corresponding line to the line Sr1 in the right image. In this case, the correspondence relationship between the line Sl1 and the line Sr1 is set only when the line Sl1 and the line Sl2 are the same line.

The stereo disparity correcting unit 90 utilizes the correspondence relationship of the line pairs determined through the line pair determining unit 80, and further corrects the disparity obtained from the right and left images.

Figure 4:
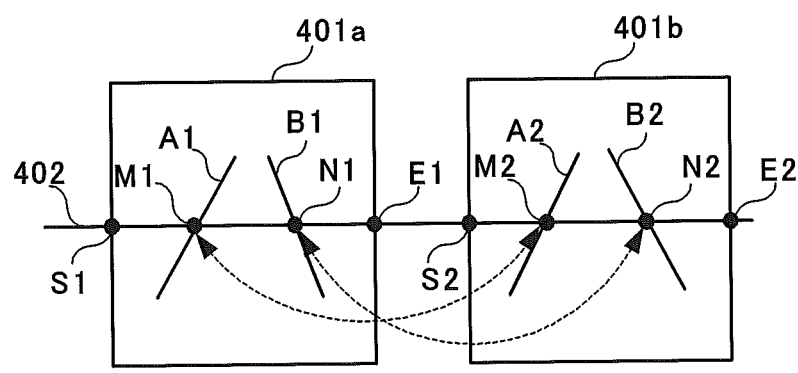
FIG. 4 is an exemplary diagram for explaining the restriction of the search range on an epipolar line.

When the correspondence relationship of a line pair is known, it is possible to set the correspondence relationship between corresponding points on the same epipolar line, for example, points N and M. Hence, by obtaining intersection points of a line pair with an epipolar line as a pair of corresponding points, the constraint based on these intersection points can be applied when searching for respective corresponding point for other points on the same epipolar line. As an example, as illustrated in FIG. 4, there are a line pair of A1 and A2 corresponding to each other and another line pair of B1 and B2 corresponding to each other, the intersection points of them with an epipolar line 402 are respectively M1, M2, and N1, N2. The start point and the end point on the left image 401a over the epipolar line 402 are S1 and E1, while the start point and the end point on the right image 401b are S2 and E2. In this condition, the corresponding point to a point between S1 and M1 always exists between S2 and M2. And the corresponding point to a point between M1 and N1 always exists between M2 and N2. Furthermore, the corresponding point to a point between N1 and E1 always exists between N2 and E2.

With the constraints explained above, the disparity of a point existing between line pairs can be corrected. Here only the line pair related to features, such as a residential building or an architectural structure, are utilized. In this way, especially for the rooftop area between the external contour line and the internal rooftop line of a building, the disparity of such areas can be corrected to more precise value. In addition, the disparity in an area between the external contour lines of different residential buildings can also be corrected. In this way, mainly contour lines of occlusion areas are corrected to more precise value. And it becomes possible to correct disparity noise in rooftop areas and that around the contour of occlusion areas.

Returning to FIG. 1, the line pair clustering unit 110 classifies the line pairs obtained from the line pair determining unit 80 into different clusters, with each cluster including all the line pairs related to one feature, such as a residential building or an architectural structure. Regarding the processing result of the line pair clustering, all the line pairs belonging to the same building are collected as a cluster, and the connecting relationship between these lines is also determined Based on the fact that the line pairs in this processing step are only those related to features, such as a residential building or an architectural structure, line pair clustering can be realized by analyzing the disparity information and the relationship between the line pairs in the three-dimensional space. Since each line pair is analyzed in the three-dimensional space in the processing afterwards, the line pair will be also referred to as three-dimensional line in the following explanation.

First of all, among all the line pairs, two three-dimensional lines satisfying the following constraints are deemed as being belonging to the same feature, and also connecting to each other in three-dimensional space. The first constraint is that the two three-dimensional lines intersect with each other, or one three-dimensional line has a vertex in the neighboring region of the vertex of another three-dimensional line.

Besides the above constraint, the current processing two three-dimensional lines have to further satisfy the following conditions. Firstly, the area surrounded by the two three-dimensional lines is larger than the building area threshold input in advance. Secondly, the disparity in the area surrounded by the two three-dimensional lines is equal or higher than the average disparity on the two three-dimensional lines, and at the same time the disparity in such an area is higher than a disparity threshold input before to address the possible lowest height of buildings in the street block where the current processing two three-dimensional lines are.

Thirdly, under the convex restriction, the polygon representing the external contour of the rooftop area and that representing the internal rooftop structure can be obtained from the three-dimensional lines having connecting relationship with each other. FIG. 5A illustrates an example case. In order to obtain the external closed contour, in the condition that the current processing two three-dimensional lines, like the two lines illustrated in FIG. 5A as L(a1) and L(a2), satisfy the constraints such as the convex restriction, the constraint of having a vertex in the neighboring region of the vertex of the other line mutually, and also the following constraint on the disparity of the surrounded polygon, they are joined together to obtain a straight line R(a1) though originally they are not connected to each other. It is necessary that the disparity in the polygon area surrounded by the two three-dimensional lines should be equal or higher than the average disparity of the two three-dimensional lines forming this polygon, and the disparity in the polygon should also be higher than the disparity threshold to address the possible lowest height of buildings in the street block where the current processing two three-dimensional lines are.

In the above process of obtaining the connecting relationship of two three-dimensional lines and also the last step of obtaining the rooftop polygon, it is possible to use the whole line or only part of the line. Considering the possibility that an extracted line is actually composed of several independent lines from multiple buildings, part of a line is also allowed to be utilized here. This phenomenon happens when multiple buildings are built in the same direction and the distance therebetween is extremely close, and in some cases the contour lines of respective buildings in the same direction are extracted as one line. FIG. 5B illustrates this case. In such a case illustrated in FIG. 5B, a line L(b1) is cut into several pieces respectively belonging to R(b1), R(b2), and R(b3). Moreover, there are also cases such as the one illustrated in FIG. 5C, where a line L(c1) longer than the original contour line is extracted due to the effects of noises. In this case, only a part of the extracted line is on the rooftop contour of the building, and thus only this part is used to get R(c1).

As illustrated in FIG. 5B, in order to generate the polygon in the last step of line pair clustering, two lines that originally do not intersect with each other may be extended so as to intersect with each other. In this case, when only a part of the line is detectable due to the influence of shadow or the like, a complete line can be recovered and then used as part of the contour of a building.

Moreover, as illustrated in FIG. 5A, in an actual image, even if originally one line is broken into several parts due to the influence of image noises or the like, such a line can be recovered by joining several parts together during the process of obtaining its belonging closed polygon.

In the process of line pair clustering, each three-dimensional line is not limited to being belonging to a building exclusively but also possibly to multiple buildings. This is because of the following possible cases. One is the above-explained case illustrated in FIG. 5B, a three-dimensional line is shared by multiple buildings built in the same direction. And there is also another case illustrated in FIG. 5D, with two adjoining buildings sharing one three-dimensional line L(d1).

Due to the area threshold and the disparity constraint on the polygon, the three-dimensional lines belonging to adjoining buildings are not wrongly determined as being belonging to the same building. This will be explained with reference to the example case illustrated in FIG. 5B. As an example, the region formed by line L(b4) and line L(b5) is actually ground, so the disparity inside it does not satisfy the disparity constraint. Moreover, the region formed by line L(b4) and line L(b5) is too small to satisfy the area threshold constraint. And the region formed by line L(b2) and line L(b5) satisfies the area threshold constraint, but not the disparity constraint since there exists ground inside it.

Moreover, under the circumstances that part of the rooftop region is shadowed and thus has different brightness from other part; it is difficult to extract a complete rooftop region only based on the color characteristic and the texture characteristic. However, with the disparity information available, it is possible to extract a complete rooftop region since the region surrounded by all the three-dimensional lines belonging to this rooftop satisfies the disparity constraint. FIG. 5E illustrates this case.

According to conventional techniques, the vertical or horizontal relationship is utilized to determine which feature a three-dimensional line belongs to, while in the present invention such geometrical relationship between lines is not utilized at all. In this way, there is no restriction on the rooftop structure or the contour shape of a feature.

Returning to FIG. 1, the plane extracting unit 120 extracts all the planes forming the rooftop of features from the clusters of three-dimensional lines, each cluster corresponding to each feature, obtained through the line pair clustering.

The polygons forming the rooftop of each feature are obtained through the process of line pair clustering. Among the extracted polygons, there are contour polygons representing the external contour of the rooftop, and also internal polygons representing the internal structure of the rooftop. Firstly, for the cluster of each feature, each internal polygon existing inside the external contour polygon is checked to be a plane or not. When an internal polygon is a plane, such a polygon is extracted as a rooftop plane. In contrary, when the internal polygon is found to be not a plane based on the disparity distribution of the area inside it while part of the area satisfies the plane constraint, such an area is divided into several planes. But when both cases explained above do not happen to the checked polygon, it is determined that the internal area of the polygon includes a curved surface. Next, the regions inside the external contour polygon other than the part in any internal polygon are also processed in the same way explained above as the internal polygon.

As a result of the above processing, the rooftop contour polygon of a feature satisfies any one of the following cases.

(1) A plane, when there is a flat rooftop. (2) Multiple planes, when there is a rooftop comprised only of planes. (3) A curved surface, when there is a rooftop with a curved surface like a dome. In this case, the rooftop is approximated by several planes and finally generated as a rooftop comprised of multiple planes, similar to the one in (2). In the case of the example buildings illustrated in FIG. 2 explained above, buildings 201 and 202 are those comprised of "multiple planes", and building 203 is the one comprised of "a plane".

Returning to FIG. 1, the plane combining unit 130 further determines the geometrical relationship of each part of the rooftop based on the internal rooftop structure of each feature obtained through the plane extracting unit 120, and finally extracts a three-dimensional model of each feature.

For different cases of the processing result from the plane extracting unit 120, the plane combining unit 130 processes them in different ways as follows.

(1) When the rooftop of a building is a plane, a three-dimensional model of the feature is directly generated based on the disparity of the plane of the rooftop. (2) When the rooftop is composed of multiple planes, the connecting relationship among all the planes is analyzed based on the disparity information, and a three-dimensional model of the feature is generated on the basis of the three-dimensional structure of the rooftop. (3) When the rooftop is a curved surface, the connecting relationship among all the planes is firstly determined by the way similar to that in the case of (2), and then a three-dimensional model of the feature is generated.

Figure 6:
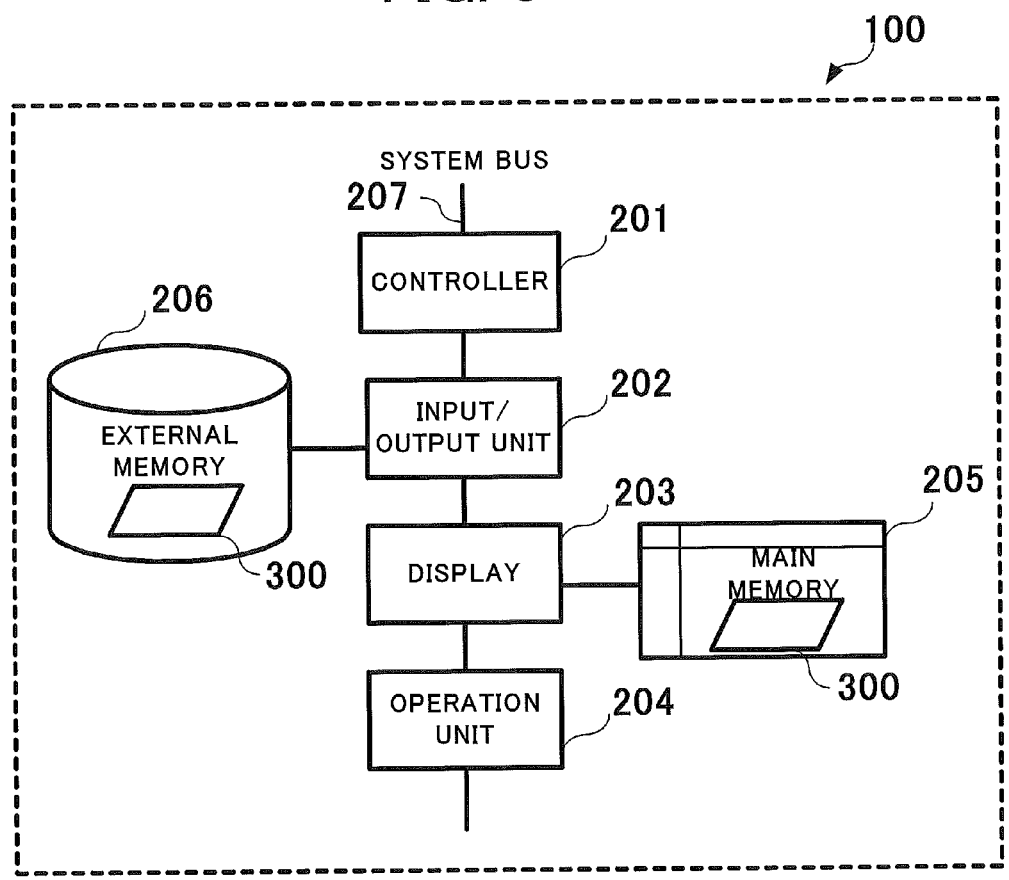
FIG. 6 is a block diagram illustrating an example structure when the three-dimensional feature data generating device of the first embodiment is implemented in a computer.

FIG. 6 is a block diagram illustrating an example physical configuration when the three-dimensional feature data generating device 100 of the first embodiment is implemented in a computer.

The three-dimensional feature data generating device 100 of the present invention is realizable by a similar hardware structure to that of a typical computer, and includes a controller 201, an input/output unit 202, a display 203, an operation unit 204, a main memory 205, an external memory 206, and a system bus 207.

The input/output unit 202, the display 203, the operation unit 204, the main memory 205, and the external memory 206 are all coupled with the controller 201 through the system bus 207.

The controller 201 includes, for example, a CPU (Central Processing Unit) and the like. The controller 201 executes a three-dimensional feature data generating process in accordance with a control program 300 stored in the external memory 206.

The input/output unit 202 includes, for example, a wireless transmitter/receiver, a wireless modem or a network terminal device, and a serial interface or a LAN (Local Area Network) interface connected with the above-explained modem or device. Image data to be processed, process parameters and line type information are receivable through the input/output unit 202, and an instruction given by an operator can be input therethrough. In addition, processed result data is also transmittable through the input/output unit 202.

The display 203 includes, for example, a display like a CRT (Cathode Ray Tube) or an LCD (Liquid Crystal Display), and a printer, and the like. The display 203 displays the input image data and the processing result by the three-dimensional feature data generating device 100.

The operation unit 204 includes pointing devices, such as a keyboard and a mouse, and an interface device that connects the pointing devices with the system bus 207. Stereo images data, process parameters, line type information can be input through the operation unit 204. Moreover, an instruction like transmitting/receiving, and an instruction for displaying a processing result are input therethrough, and are supplied to the controller 201.

The main memory 205 is, for example, a main memory like a RAM (Random Access Memory). The control program 300 stored in the external memory 206 is loaded in the main memory 205, which is utilized as a work area for the controller 201.

The external memory 206 is composed of a non-volatile memory such as a flash memory, a hard disk, a DVD-RAM (Digital Versatile Disk Random Access Memory), a ROM (Read Only Memory), a magnetic disk, and a semiconductor memory. The external memory 206 stores in advance the control program 300 for the controller 201 to execute the three-dimensional feature data generating process. Moreover, the external memory 206 supplies stored data related to the control program 300 to the controller 201 in accordance with an instruction from the controller 201. Furthermore, the external memory 206 stores data supplied from the controller 201.

The processes by the respective unit of the three-dimensional feature data generating device 100 illustrated in FIG. 1 as explained above are executed by the control program 300 through utilizing the controller 201, the input/output unit 202, the display 203, the operation unit 204, the main memory 205, and the external memory 206 as resources.

When the control program 300 realizing the above-explained respective functions is run by the controller 201 on a computer processing device, the three-dimensional feature data generating device 100 can be realized over software. In this case, the controller 201 loads the control program 300 stored in the external memory 206 into the main memory 205 and runs such a program by controlling all the operating components in order to realize the above-explained respective functions, thereby realizing the three-dimensional feature data generating device 100 over software.

The center part executing the processes of the three-dimensional feature data generating device 100 of the present invention is not limited to a dedicated system, and can be realized using a normal computer system.

Moreover, the three-dimensional feature data generating device may be realized by building the function of generating the three-dimensional data explained above on the hardware components like an LSI (Large Scale Integration) and constructing an electric circuit.

Figure 7:
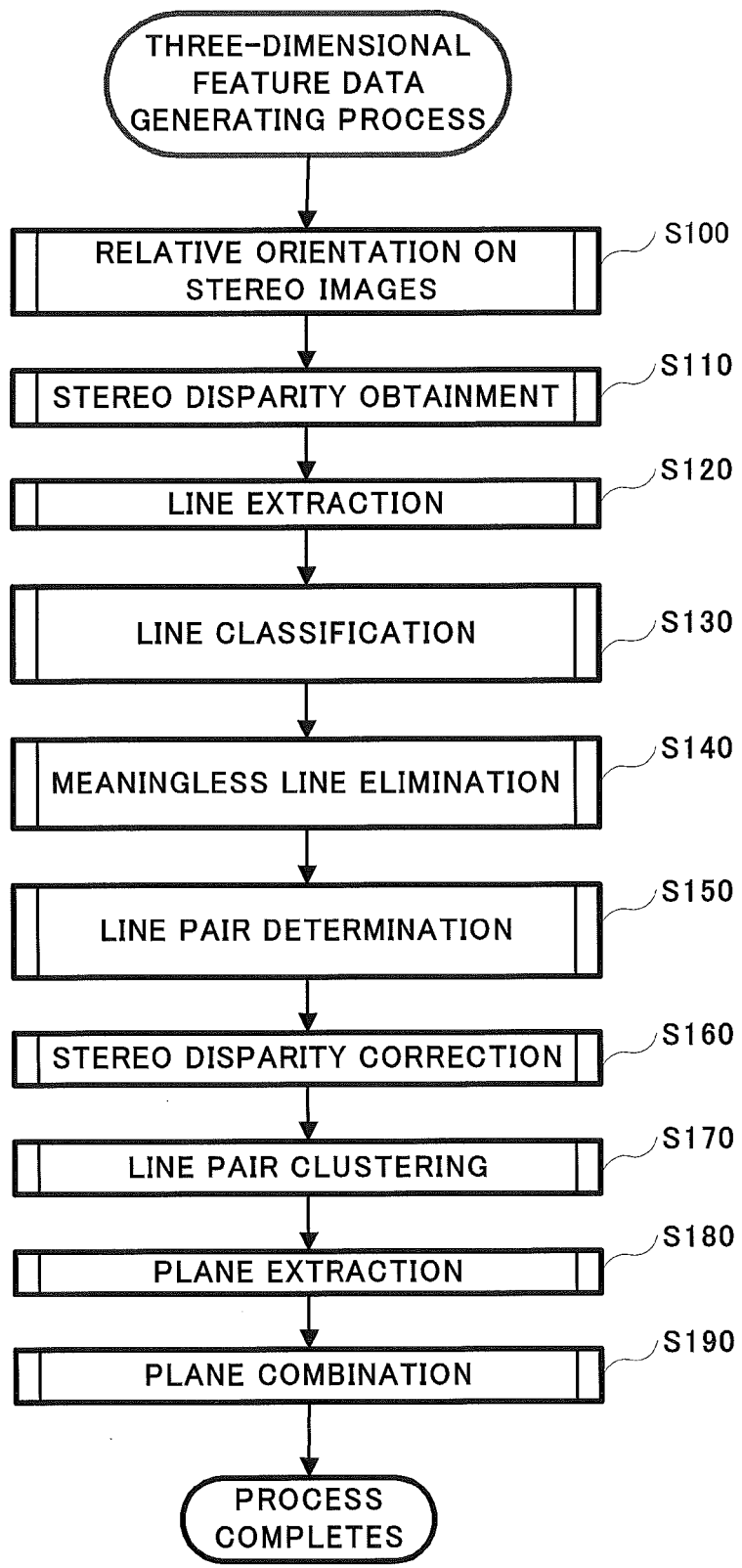
FIG. 7 is a flowchart illustrating the whole flow of a three-dimensional feature data generating process according to the first embodiment.

An explanation will be given below about the operation of the three-dimensional feature data generating device 100 realizing the above-explained functions with reference to the drawings. First of all, an overall flow of the process will be explained with reference to FIG. 7. FIG. 7 is a flowchart illustrating a three-dimensional feature data generating process.

When stereo image data is input in the stereo image data input unit 10, line type information is input in the line type input unit 20, and process parameters are input in the processing rule input unit 30, respectively, the three-dimensional feature data generating device 100 starts the three-dimensional feature data generating process illustrated in FIG. 7.

First, the three-dimensional feature data generating device 100 executes relative orientation on stereo images (step S100), and then the process of obtaining stereo disparity (step S110). That is, the stereo disparity calculating unit 40 carries out relative orientation on the right and left images based on the input stereo images and the image shooting parameters and then calculates the stereo disparity. And the stereo disparity calculating unit 40 calculates the stereo disparity by stereo matching.

In the step following the step S110, the three-dimensional feature data generating device 100 executes the process of line extraction (step S120). That is, the line extracting unit 50 extracts lines from the input right and left images respectively.

In the step following the step S120, the three-dimensional feature data generating device 100 executes the process of line classification (step S130). That is, the line classification unit 60 classifies all the lines extracted by the line extracting unit 50 into different line types based on input line type information and also the disparity information obtained from the stereo disparity calculating unit 40. This step is also performed on the right and left images respectively.

In the step following the step S130, the three-dimensional feature data generating device 100 executes the process of eliminating meaningless lines (step S140). That is, the meaningless line eliminating unit 70 eliminates meaningless lines for each line type. After the process in this step, only lines related to features are left. This step is also performed on the right and left images respectively.

In the step following the step S140, the three-dimensional feature data generating device 100 executes the process of determining line pairs (step S150). That is, the line pair determining unit 80 utilizes the disparity obtained from the stereo disparity calculating unit 40 to set correspondence relationship between corresponding lines from the right and left images related to features.

In the step following the step S150, the three-dimensional feature data generating device 100 executes the process of correcting the stereo disparity (step S160). That is, the stereo disparity correcting unit 90 corrects the disparity formerly calculated by the stereo disparity calculating unit 40 based on the line pair obtained from the line pair determining unit 80.

In the step following the step S160, the three-dimensional feature data generating device 100 executes the process of line pair clustering (step S170). That is, the line pair clustering unit 110 determines the belonging relationship of one line pair obtained from the line pair determining unit 80 to a feature based on the disparity corrected by the stereo disparity correcting unit 90, and further extracts the line pairs with the disparity information, that is, the closed polygon forming the rooftop of each feature from the related three-dimensional lines.

In the step following the step S170, the three-dimensional feature data generating device 100 executes the process of plane extraction (step S180). That is, the plane extracting unit 120 extracts one plane, or multiple planes, or multiple planes approximating a curved surface of a rooftop under different conditions from the closed polygon forming the rooftop of each feature obtained from the line pair clustering unit 110.

In the step following the step S180, the three-dimensional feature data generating device 100 executes the process of combining the planes (step S190). That is, the plane combining unit 130 analyzes the planes forming the rooftop structure of current processing feature obtained from the plane extracting unit 120, and at the same time determines the geometrical relationship among the planes from the same rooftop structure, and eventually generates a three-dimensional model of each feature.

The details of respective process from the step S100 to the step S190 will be explained below with reference to the flowcharts of FIG. 8 to FIG. 21.

First, an explanation will be given about relative orientation on the stereo images in the above-explained step S100 with reference to FIG. 8.

Figure 8:
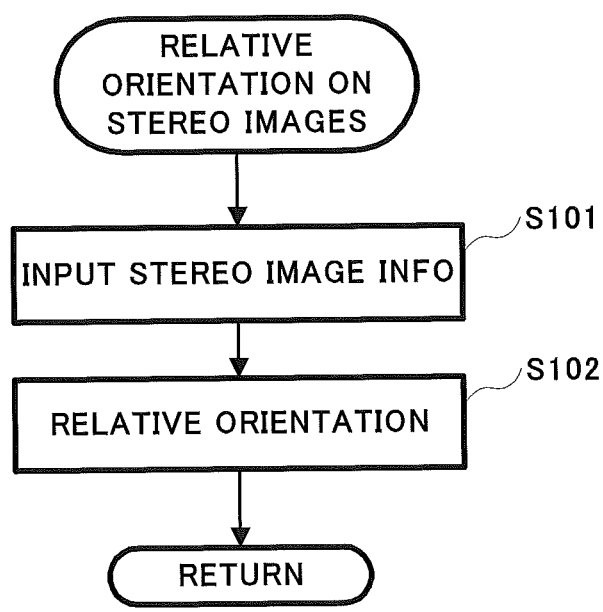
FIG. 8 is a flowchart illustrating the details of relative orientation over stereo images according to the first embodiment.

As illustrated in FIG. 8, through the stereo image data input unit 10 the information of stereo images are input (step S101). That is, stereo image data, including stereo images and image shooting parameters, is input.

Next, the stereo disparity calculating unit 40 performs relative orientation on the right and left images based on the input stereo images and image shooting parameters (step S102). After relative orientation, the search space of a corresponding point is decreased from two-dimension to one-dimension, i.e., the corresponding points on the right and left images only exist on the same epipolar line.

Figure 9:
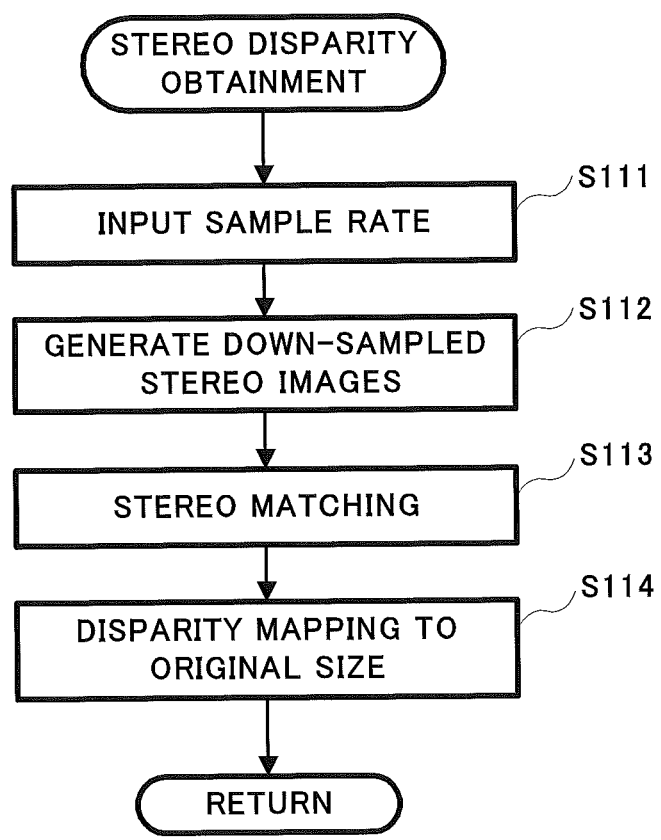
FIG. 9 is a flowchart illustrating the details of stereo disparity calculating process according to the first embodiment.

Next, with reference to FIG. 9, an explanation will be given about the process of calculating stereo disparity in the above-explained step S110.

The stereo disparity calculating unit 40 firstly acquires the sample rate stored in advance in the processing rule memory 31 (step S111), and generates down-sampled stereo images respectively of the right and left images based on the acquired sample rate (step S112), and then performs stereo matching on the down-sampled right and left images (step S113), and performs mapping of the disparity on the down-sampled stereo images to the stereo images of the original size (step S114).

Figure 10:
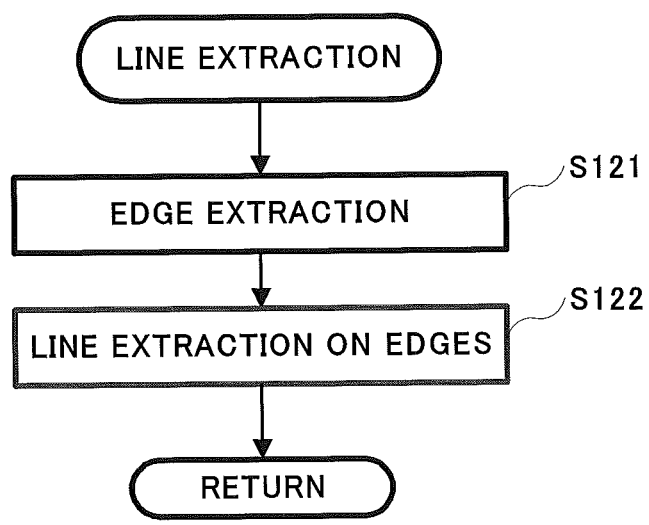
FIG. 10 is a flowchart illustrating the details of line extraction process according to the first embodiment.

Next, with reference to FIG. 10, an explanation will be given about the process of line extraction in the above-explained step S120.

The line extracting unit 50 extracts edges on the image (step S121), and then extracts lines based on the extracted edges (step S122).

Figure 11:
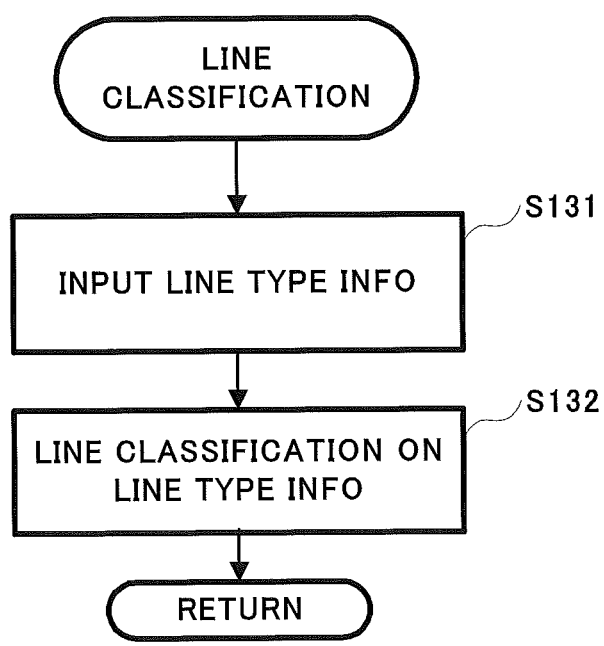
FIG. 11 is a flowchart illustrating the details of line classification process according to the first embodiment.

Next, with reference to FIG. 11, an explanation will be given about the process of line classification in the above-explained step S130.

The line classification unit 60 firstly acquires line type information (step S131) stored in advance in the line type memory 21.

The line classification unit 60 determines the line type of each line (step S132). That is, all the lines are classified based on the input line type information.

Figure 12:
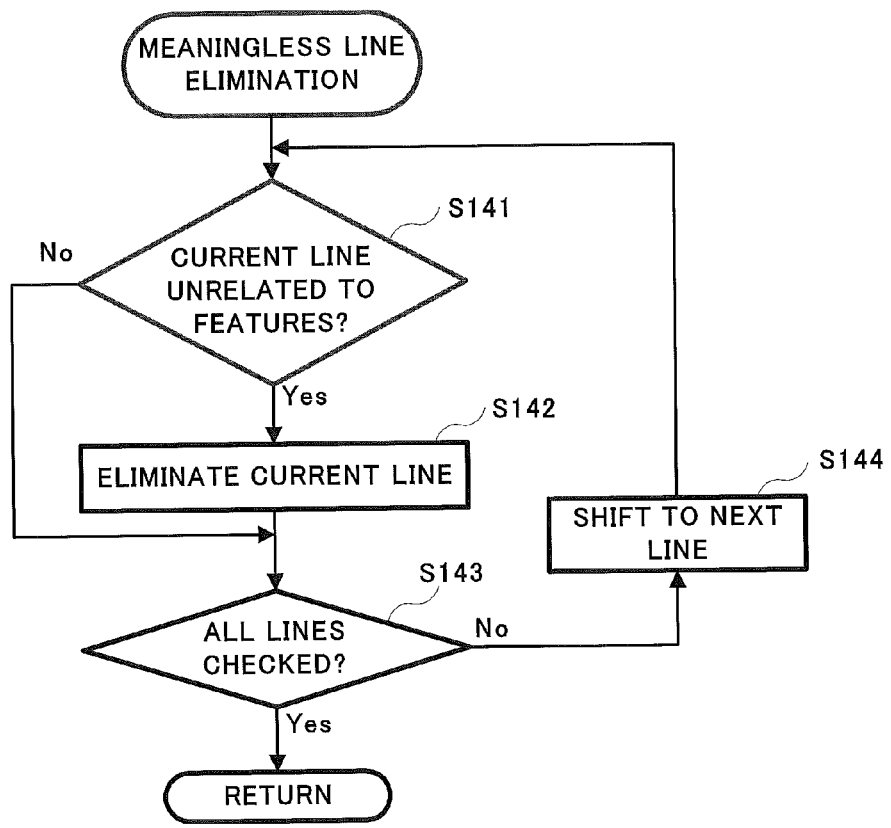
FIG. 12 is a flowchart illustrating the details of meaningless line eliminating process according to the first embodiment.

Next, with reference to FIG. 12, an explanation will be given about the process of eliminating meaningless lines in the above-explained step S140.

The meaningless line eliminating unit 70 determines whether a line is unrelated to features or not (step S141), then progresses the process to the following step S143 when determining that the line is related to features (step S141: NO), or eliminates the line (step S142) when determining that the line is unrelated to features (step S141: YES). And then the meaningless line eliminating unit 70 checks whether all the lines are checked or not (step S143), shifts to next line (step S144) if not all the lines have been checked yet (step S143: NO), and returns the process to the above-explained step S141. Conversely, if all the lines have been checked (step S143: YES), the meaningless line eliminating unit terminates the process of eliminating meaningless lines.

Next, with reference to figures from FIG. 13 to FIG. 15, an explanation will be given about the process of determining line pairs in the above-explained step S150.

Figure 13:
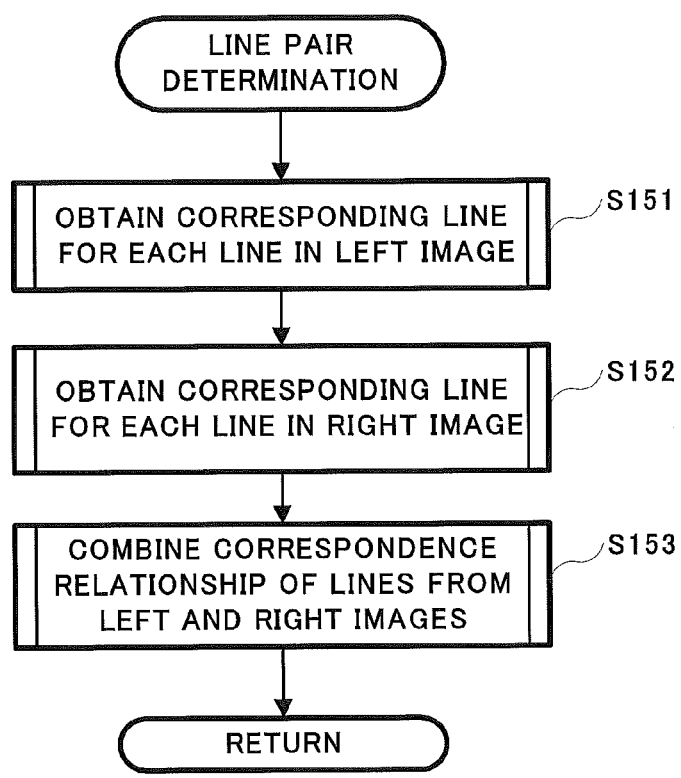
FIG. 13 is a flowchart illustrating the details of line pair determining process according to the first embodiment.

As illustrated in FIG. 13, the line pair determining unit 80 finds out the corresponding line of each line in the left image (step S151). That is, the corresponding line in the right image to each line in the left image is found out.

Figure 14:
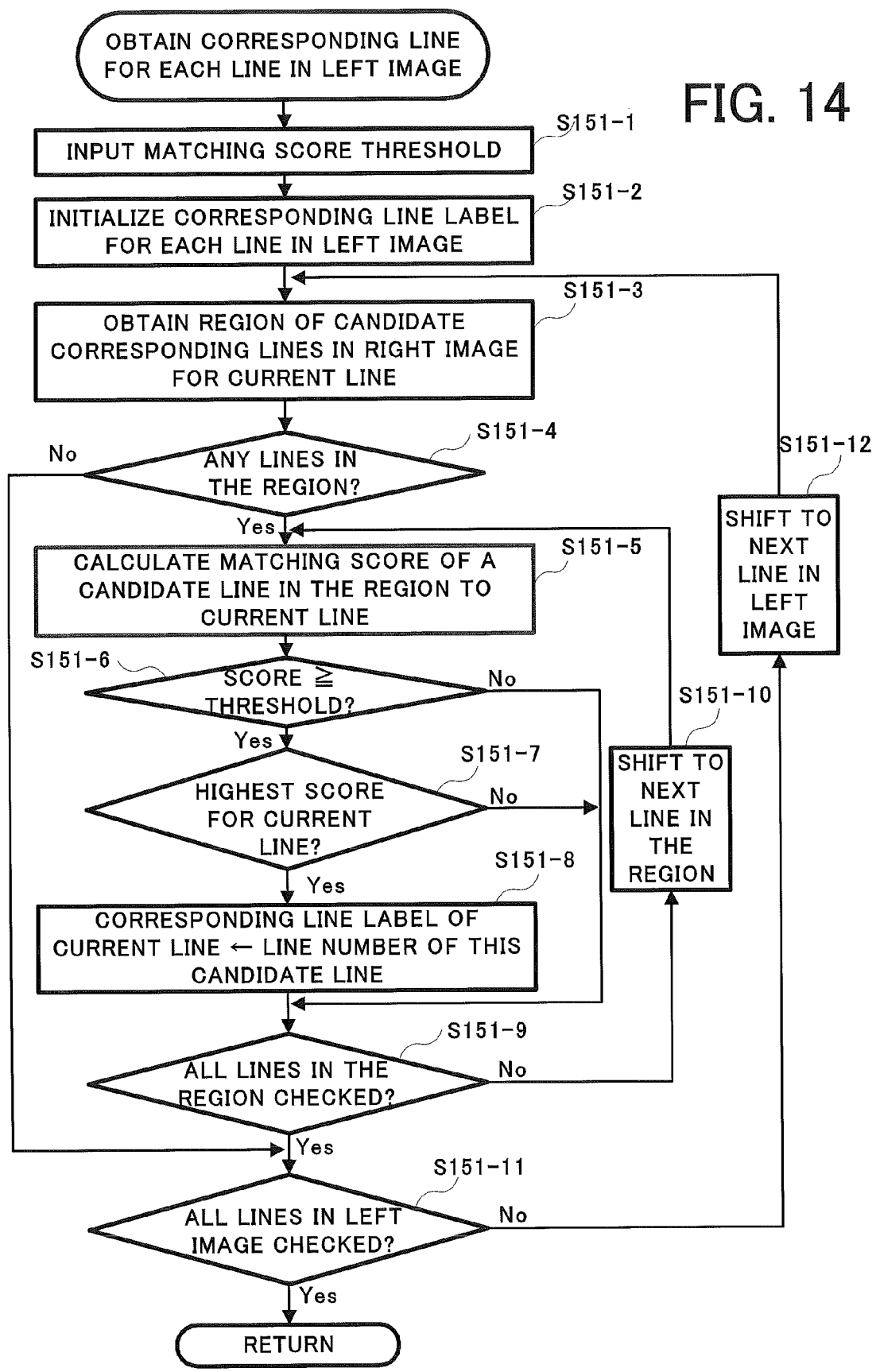
FIG. 14 is a flowchart illustrating the details of how to extract the corresponding line in the right image to a line in the left image according to the first embodiment.
Figure 15:
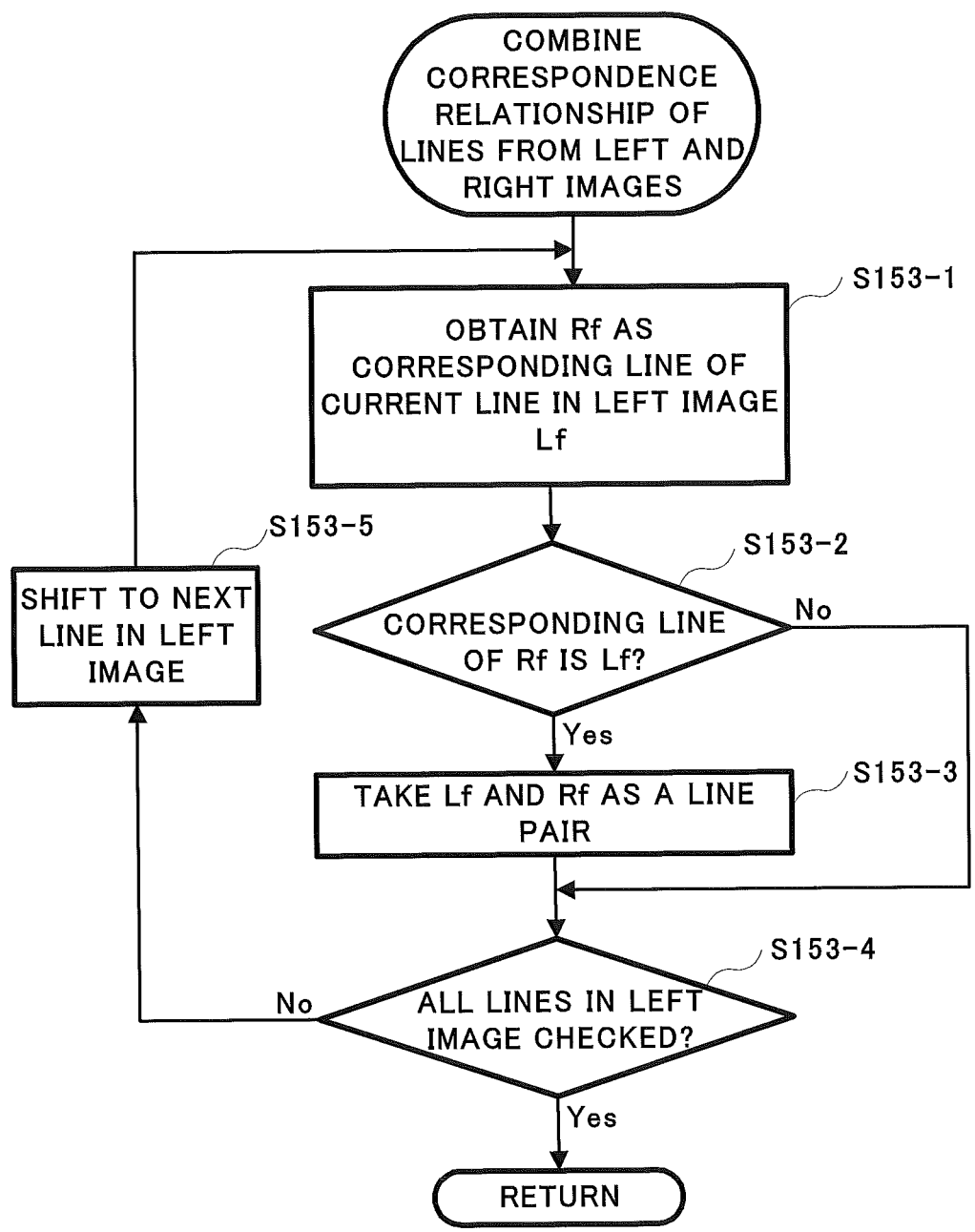
FIG. 15 is a flowchart illustrating the details of building correspondence relationship between a pair of lines respectively in the right and left images according to the first embodiment.

More specifically, during the searching of the corresponding line to a line in the left image, as illustrated in FIG. 14, a matching score threshold stored in advance in the processing rule memory 31 is input (step S151-1), and the label of a corresponding line for each line in the left image is initialized (step S151-2). Then the region in the right image, which includes the candidate corresponding lines to current processing line, is obtained based on the disparity information (step S151-3). That is, the region in the right image possibly including the candidate corresponding line to current processing line is obtained based on the disparity information. Next, the region is checked whether there are lines in it or not (step S151-4).

When there are no lines in the region (step S151-4: NO), the process progresses to step S151-11 to be discussed later. Conversely, when there are lines in the region (step S151-4: YES), the matching score of each line in the region with current processing line is calculated (step S151-5). Then the score is checked whether it is equal to or greater than the matching score threshold or not (step S151-6), and also whether it is the highest score for current processing line or not (step S151-7).

When the matching score is smaller than the threshold (step S151-6: NO), or is not the highest matching score for current processing line (step S151-7: NO), the process progresses to step S151-9 to be discussed later. Conversely, when the matching score is equal to or larger than the threshold (step S151-6: YES), and at the same time is the highest score for current processing line (step S151-7: YES), the line number of this candidate corresponding line is set as the corresponding line label of the current processing line (step S151-8).

Then the line pair determining unit 80 checks whether all the lines in the region are checked or not (step S151-9), and shifts to next line in the region (step S151-10) if all the lines in the region have been checked (step S151-9: NO), and returns the process to the above-explained step S151-5.

In contrary, if not all the lines in the regions have been checked (step S151-9: YES), the line pair determining unit 80 checks whether all the lines in the left image have been processed or not (step S151-11). If not all the lines in the left image have been processed (step S151-11: NO), the line pair determining unit 80 shifts to the next line in the left image (step S151-12), and returns to the above-explained step S151-3. Conversely, when all the lines in the left image have been processed (step S151-11: YES), the process of searching the corresponding line for each line in the left image is terminated here.

Returning to FIG. 13, the line pair determining unit 80 finds out the corresponding line to each line in the right image (step S152).

The process of searching for the corresponding line to each line in the right image can be performed in the same steps in the above-explained FIG. 14, with substituting right image for left image. Hence, the flowchart of the process of searching for the corresponding line to each line in the right image will be omitted.

Returning to FIG. 13, the line pair determining unit 80 combines the correspondence relationship between the lines from the right image and those from the left image (step S153).

More specifically, the combination process of the correspondence relationship between lines from the right and left images is explained as follows. As illustrated in FIG. 15, when line Rf in the right image is determined as the corresponding line of the current processing line Lf (step S153-1), line Lf is then checked whether it is the corresponding line of line Rf or not (step S153-2).

If line Lf is not the corresponding line of Rf (step S153-2: NO), the process progresses to step S153-4 to be discussed later. Conversely, if line Lf is the corresponding line to Rf (step S153-2: YES), the pair relationship between Lf and Rf is established (step S153-3).

Then the line pair determining unit 80 checks if all the lines in the left image have been checked for the line pair relationship determination (step S153-4), and when not all the lines have been checked yet (step S153-4: NO), the process shifts to the next line (step S153-5), and returns to the above-explained step S153-1. Conversely, when all the lines have been checked (step S153-4: YES), the combination of the correspondence relationship on the right and left images is terminated.

Figure 16:
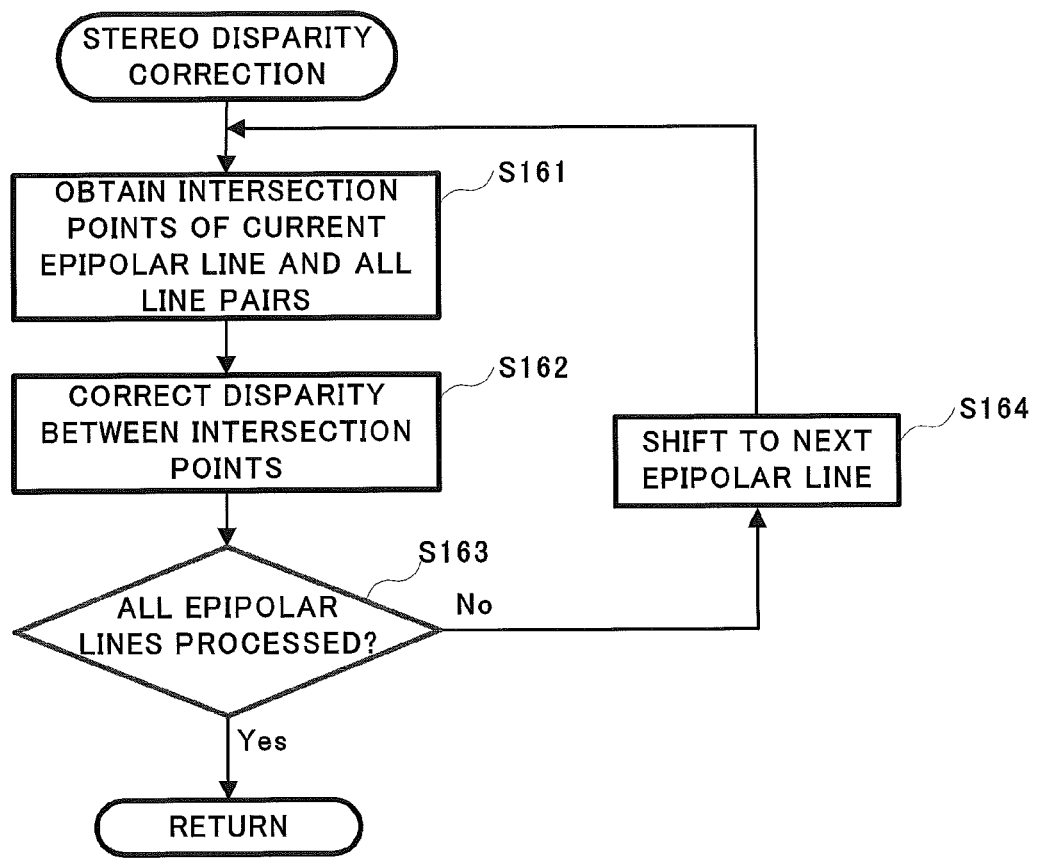
FIG. 16 is a flowchart illustrating the details of stereo disparity correcting process according to the first embodiment.

Next, with reference to FIG. 16, an explanation will be given about the process of correcting the stereo disparity in the above-explained step S160.

The stereo disparity correcting unit 90 obtains an intersection point between the current processing epipolar line and all the line pairs (step S161). That is, intersection points between the current processing epipolar line with all the line pairs are obtained.

The stereo disparity correcting unit 90 corrects the disparity between intersection points (step S162). That is, the disparity between the intersection points is corrected based on the correspondence relationship of each pair of the intersection points respectively in the right and left images.

Next, the stereo disparity correcting unit 90 checks whether all the epipolar lines are processed or not (step S163).

When not all the epipolar lines are processed yet (step S163: NO), the stereo disparity correcting unit 90 shifts to the next epipolar line (step S164), and returns to the above-explained step S161.

Conversely, when all the epipolar lines have been processed (step S163: YES), the stereo disparity correcting unit 90 terminates the process of correcting the stereo disparity here.

Figure 17:
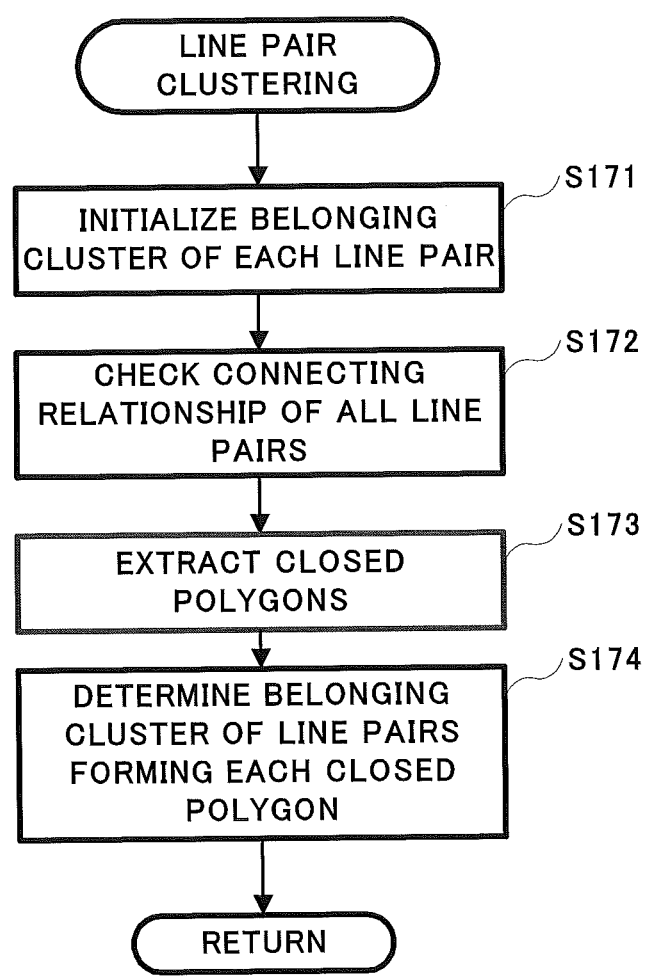
FIG. 17 is a flowchart illustrating the details of line pair clustering process according to the first embodiment.

Next, with reference to FIG. 17, an explanation will be given about the process of line pair clustering in the above-explained step S170.

The line pair clustering unit 110 initializes the belonging cluster of each line pair (step S171).

The line pair clustering unit 110 checks mutual connecting relationships among all the line pairs (step S172).

The line pair clustering unit 110 extracts a closed polygon (step S173). That is, based on the connecting relationship of the line pairs, together with disparity limitation, area constraint and convex constraint and the like, a closed polygon is extracted.

Next, the line pair clustering unit 110 determines the belonging relationship of the line pairs forming each closed polygon for each building (step S174).

Next, with reference to FIGS. 18 to 20, an explanation will be given about the process of plane extraction for each feature in the above-explained step S180.

Figure 18:
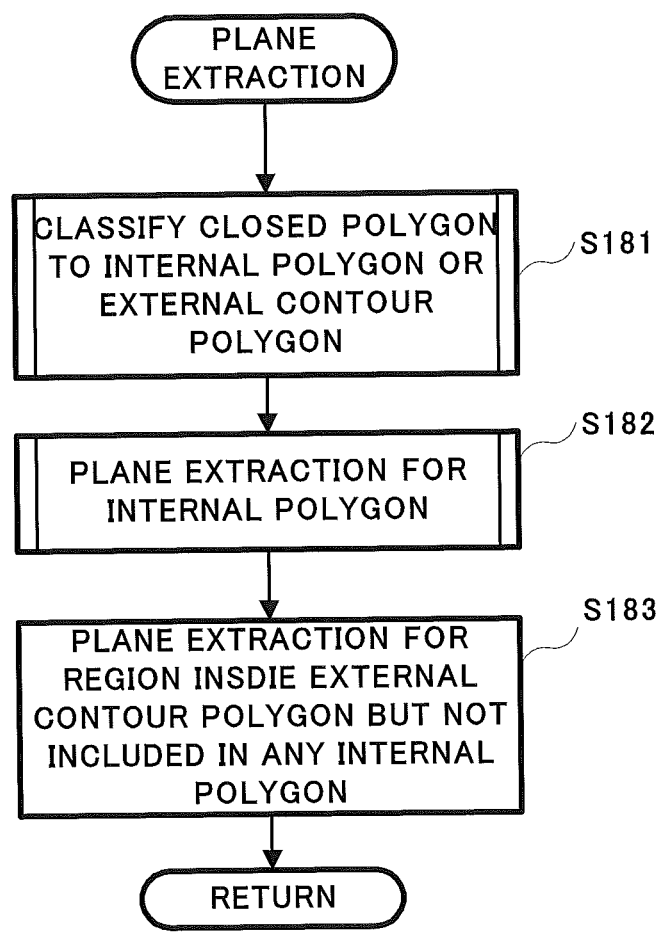
FIG. 18 is a flowchart illustrating the details of plane extracting process according to the first embodiment.

As illustrated in FIG. 18, the plane extracting unit 120 classifies all the closed polygons into internal polygons and external contour polygons (step S181).

Figure 19:
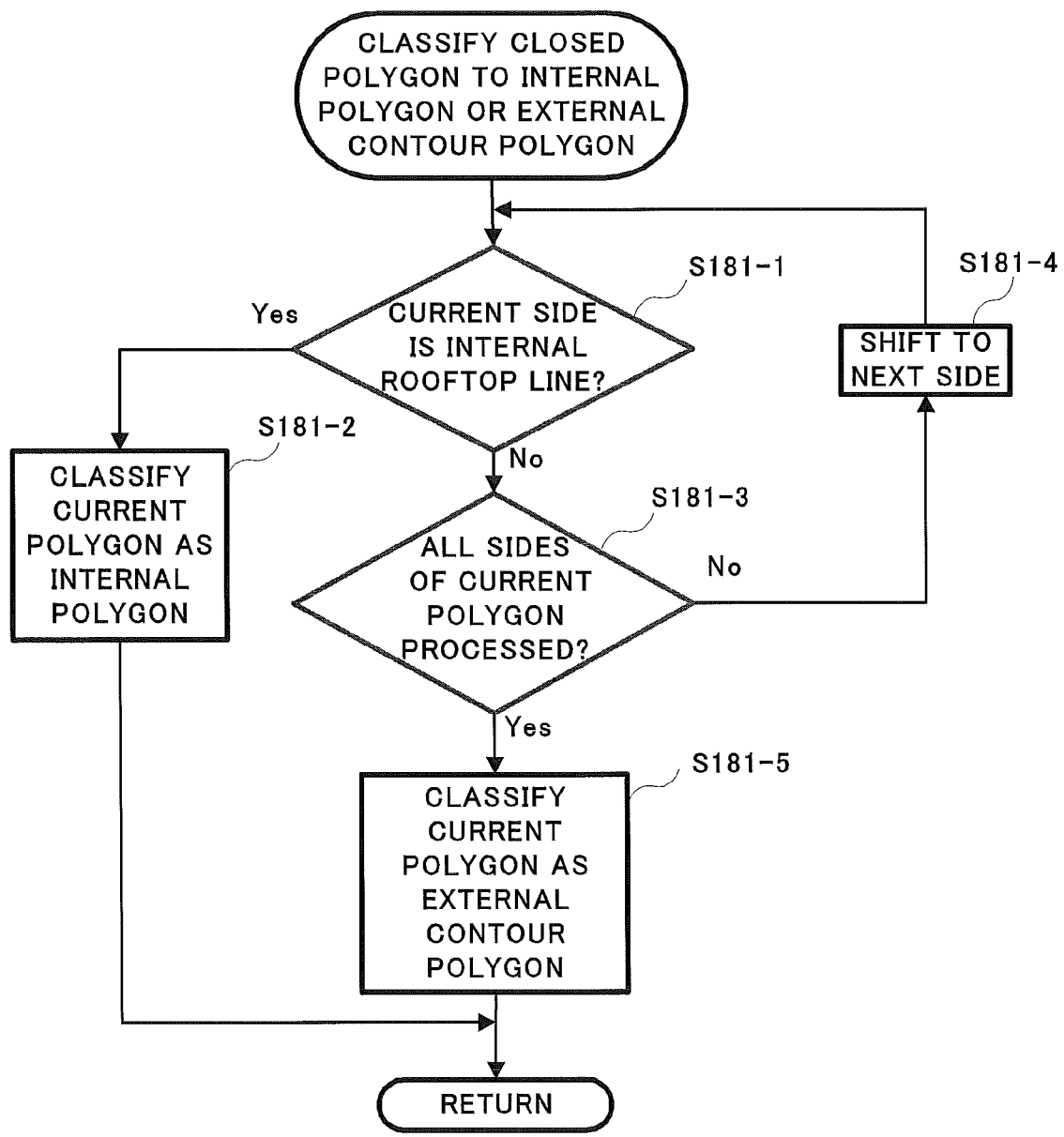
FIG. 19 is a flowchart illustrating the details of how to classify closed polygons according to the first embodiment.

More specifically, in the classification of closed polygons, as illustrated in FIG. 19, the to-be-processed side of current processing polygon is firstly checked whether to be an internal rooftop line or not (step S181-1). When the side is found to be the internal rooftop line (step S181-1: YES), the current processing polygon is determined as an internal polygon (step S181-2). Conversely, when the side is not the internal rooftop line (step S181-1: NO), the plane extracting unit 120 further checks whether all the sides of current processing polygon have been processed or not (step S181-3). When not all the sides of current processing polygon are processed yet (step S181-3: NO), the process is shifted to the next side of current processing polygon (step S181-4), and returns to the above-explained step S181-1. Conversely, when all the sides of current processing polygon are processed (step S181-3: YES), the current processing polygon is determined as an external contour polygon (step S181-5).

Returning to FIG. 18, the plane extracting unit 120 executes the internal polygon plane extraction process (step S182).

Figure 20:
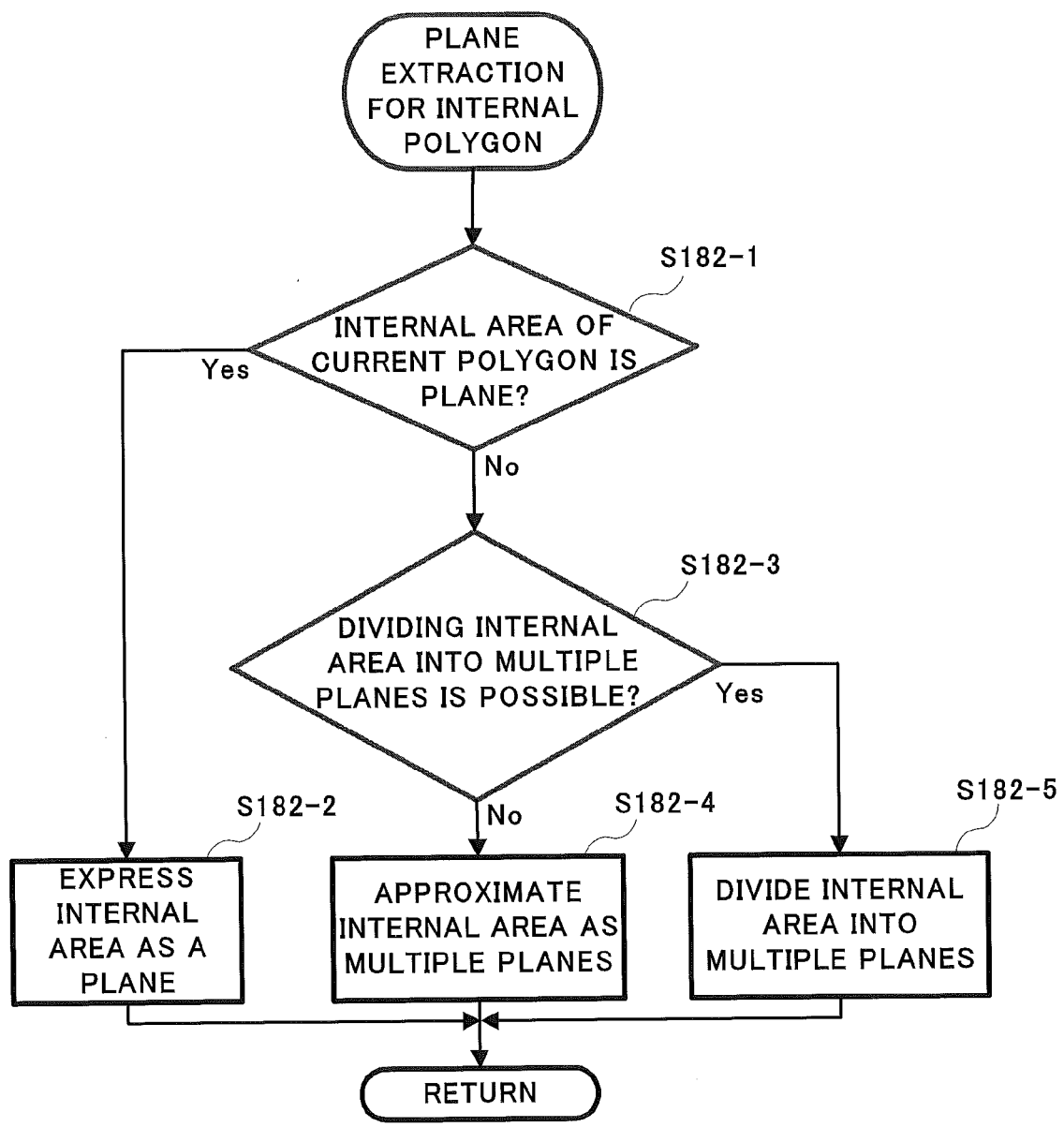
FIG. 20 is a flowchart illustrating the details of plane determining process according to the first embodiment.

More specifically, as illustrated in FIG. 20, the plane extracting unit 120 checks whether the internal area of current processing polygon is a plane or not (step S182-1), and if it is a plane (step S182-1: YES), the internal area of the polygon is expressed as a plane (step S182-2). On the other hand, if the internal area is not a plane (step S182-1: NO), the plane extracting unit 120 checks whether it is possible to divide the internal area of the polygon into multiple planes or not (step S182-3), and if the internal area is undividable into multiple planes (step S182-3: NO), the internal area of the polygon is approximated by multiple planes (step S182-4). Conversely, if the internal area is dividable (step S182-3: YES), the internal area of the polygon is divided into multiple planes directly (step S182-5).

Returning to FIG. 18, the plane extracting unit 120 executes the plane extraction process in the region inside the external contour polygon area but not included in any internal polygon (step S183).

Regarding the plane extraction in such regions, the same steps as the process illustrated in FIG. 20 explained above are executed.

Figure 21:
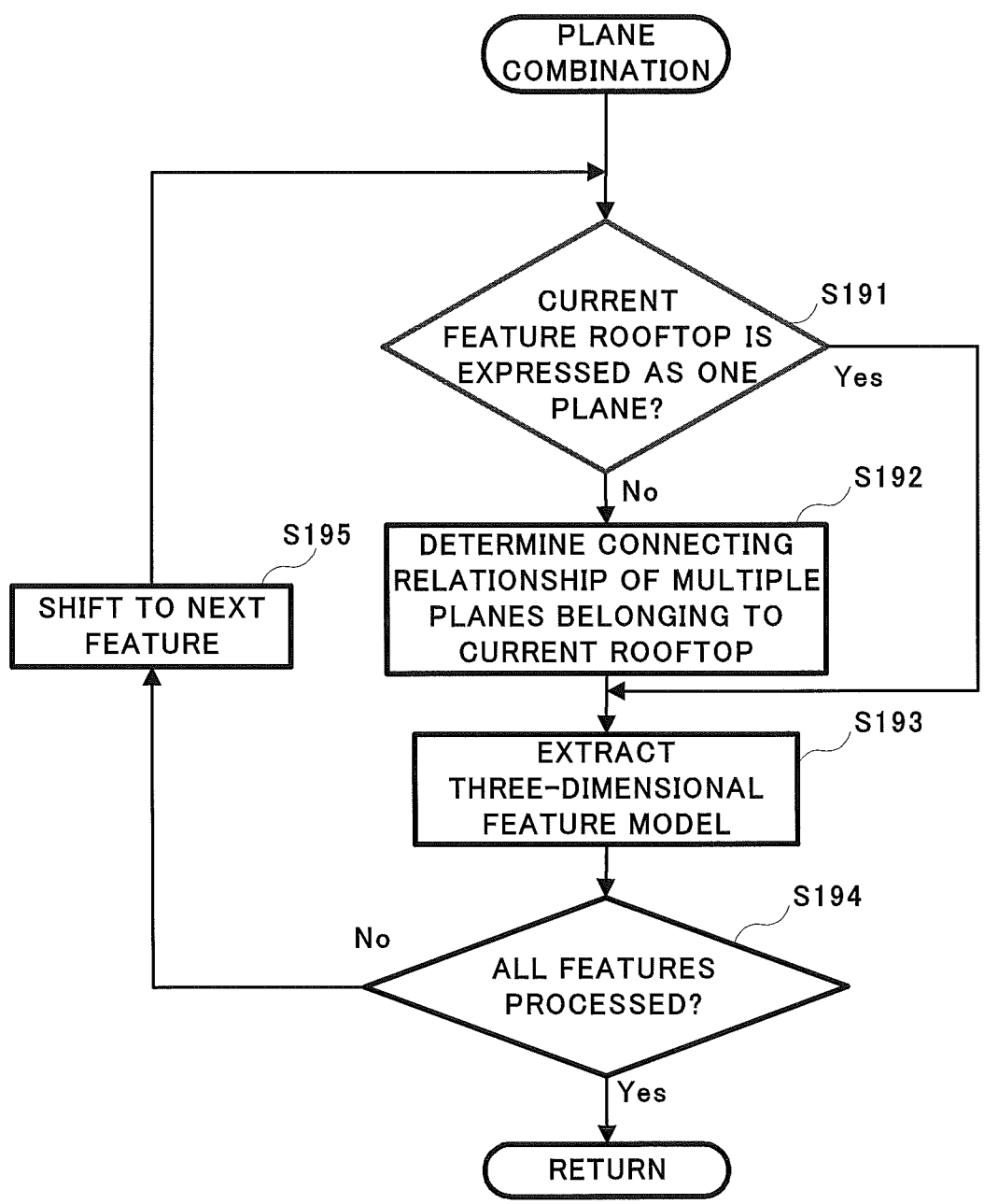
FIG. 21 is a flowchart illustrating the details of plane combining process according to the first embodiment.

Finally, with reference to FIG. 21, an explanation will be given about the plane combining process in the above-explained step S190.

First, the plane combining unit 130 checks whether the rooftop of a feature is a plane or not (step S191). That is, the rooftop of current processing feature is checked whether to be a plane or not.

When the current processing rooftop is found to be a plane (step S191: YES), the plane combining unit 130 progresses the process to step S193 to be discussed later.

Conversely, when the current processing rooftop is not a plane (step S191: NO), the plane combining unit 130 determines the connecting relationship of multiple planes belonging to this rooftop (step S192). That is, connecting relationship between multiple planes belonging to the processing rooftop is determined The plane combining unit 130 extracts a three-dimensional feature model (step S193). That is, the three-dimensional feature model of the current processing feature is extracted.

The plane combining unit 130 checks whether all the features have been processed or not (step S194).

When not all the features have been processed yet (step S194: NO), the plane combining unit 130 shifts the process to next feature (step S195), and returns the process to the above-explained step S191.

Conversely, when all the features have been processed (step S194: YES), the plane combining unit 130 terminates the plane combining process here.

As explained above, the three-dimensional feature data generating process illustrated in FIG. 7 (FIGS. 8 to 21) can generate the three-dimensional model of each feature inside a region including the features like the residential buildings and architectural structures, based on stereo information of several images taken at different viewpoints from the sky and also the inherent line information on the residential buildings and the architectural structures.

(Second Embodiment)

Next, a detailed explanation will be given about a second embodiment of the present invention with reference to the drawings.

Figure 22:
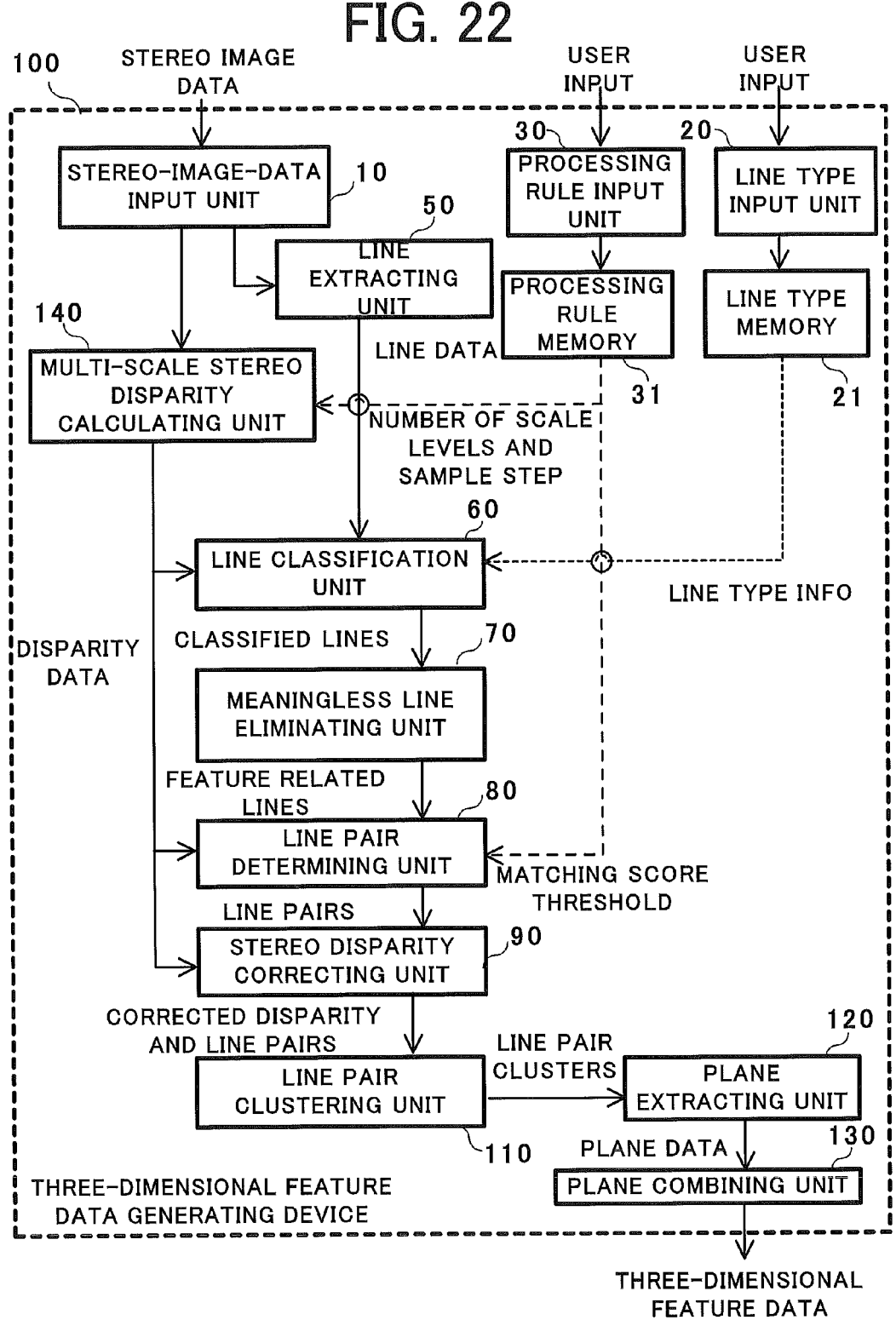
FIG. 22 is a block diagram illustrating the general structure of a three-dimensional feature data generating device according to a second embodiment.

First, the block diagram of FIG. 22 illustrates the general structure of a three-dimensional feature data generating device 100 according to the second embodiment of the present invention.

With reference to FIG. 22, the second embodiment of the present invention differs from the first embodiment that the stereo disparity calculating unit 40 of the first embodiment illustrated in FIG. 1 is replaced with a multi-scale stereo disparity calculating unit 140.

The multi-scale stereo disparity calculating unit 140 generate stereo images in multi-scales, calculates the disparity on each scale, and eventually combines the disparity information in multi-scales, thereby obtaining the disparity on the stereo images of the original size.

In this case, a wide searching range for calculating disparity can be obtained efficiently from stereo images of coarser scale, while in stereo images of finer scales more details of images are reflected and thus more precise disparity is obtainable. When stereo images in multi-scales are utilized, both of the above-explained advantages become available at the same time.

In the implementation, it is desirable that the number of scale levels for multi-scale analysis and the sample step for producing each layer are set according to not only the desired processing efficiency, but also the desired processing effect and the image contents.

According to the second embodiment, the basic function of the processing rule input unit 30 is the same as that of the first embodiment. However, unlike the first embodiment, parameters input into the multi-scale stereo disparity calculating unit 140 through the processing rule input unit 30 during stereo disparity calculation are the number of scale levels and the sample step for producing each layer. And parameters for the process of determining line pairs are the same as those of the first embodiment, and thus the explanation thereof will be omitted.

The physical structure for the three-dimensional feature data generating device 100 of the second embodiment implemented in a computer is basically the same as the structure of the first embodiment illustrated in the block diagram of FIG. 6, and thus the explanation thereof will be omitted.

Next, a detailed explanation will be given about the operation of the three-dimensional feature data generating device 100 according to the second embodiment with reference to the drawings.

Figure 23:
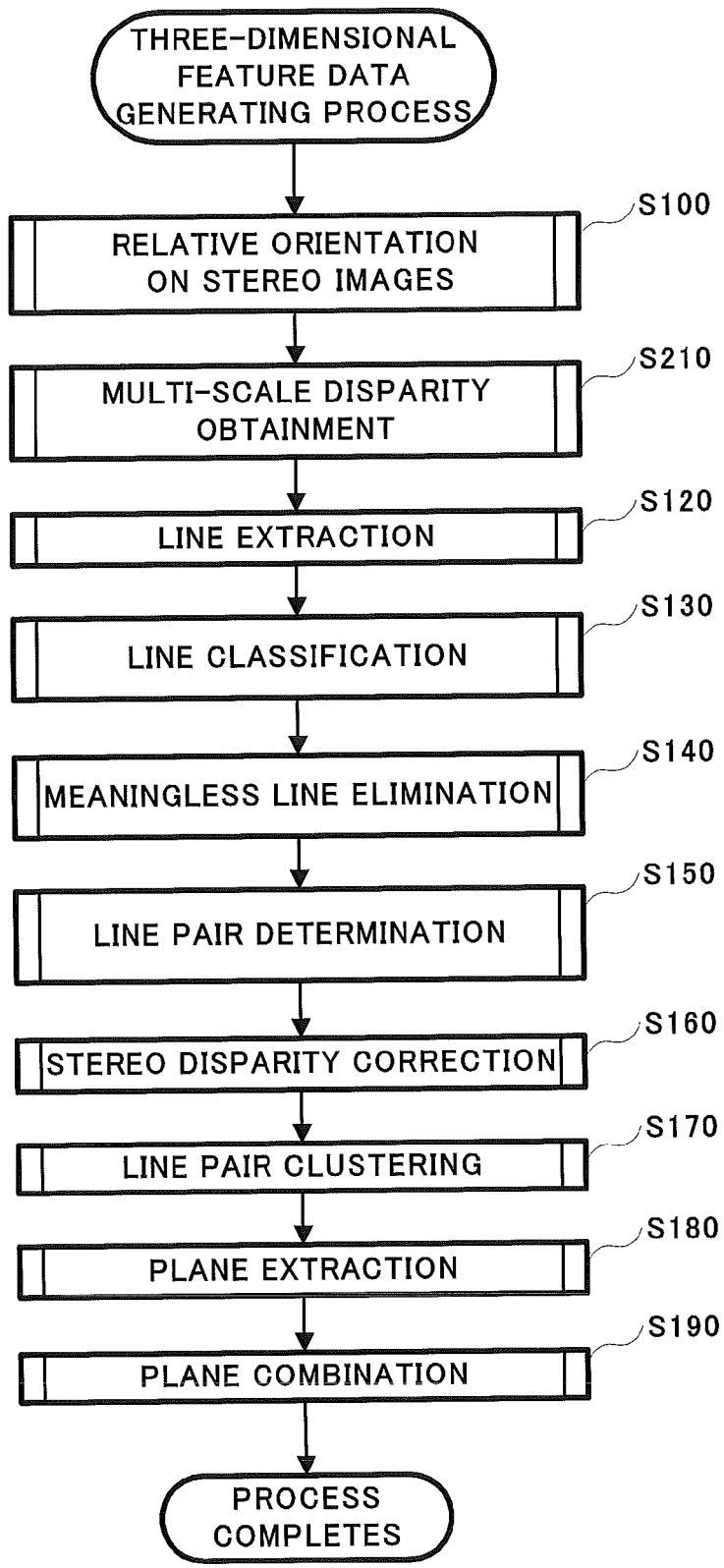
FIG. 23 is a flowchart illustrating the whole flow of a three-dimensional feature data generating method according to the second embodiment.

First, an overall flow of the process will be explained with reference to FIG. 23. FIG. 23 is a flowchart illustrating a three-dimensional feature data generating process according to the second embodiment.

Like the first embodiment, when stereo image data is input in the stereo image data input unit 10, line type information is input in the line type input unit 20, and process parameters are input in the processing rule input unit 30, respectively, the three-dimensional feature data generating process in FIG. 23 starts.

The process in each step in the flow of the overall process is the same as that of the first embodiment other than an obtainment of the multi-scale disparity (step S210), and thus the explanation thereof will be omitted.

Figure 24:
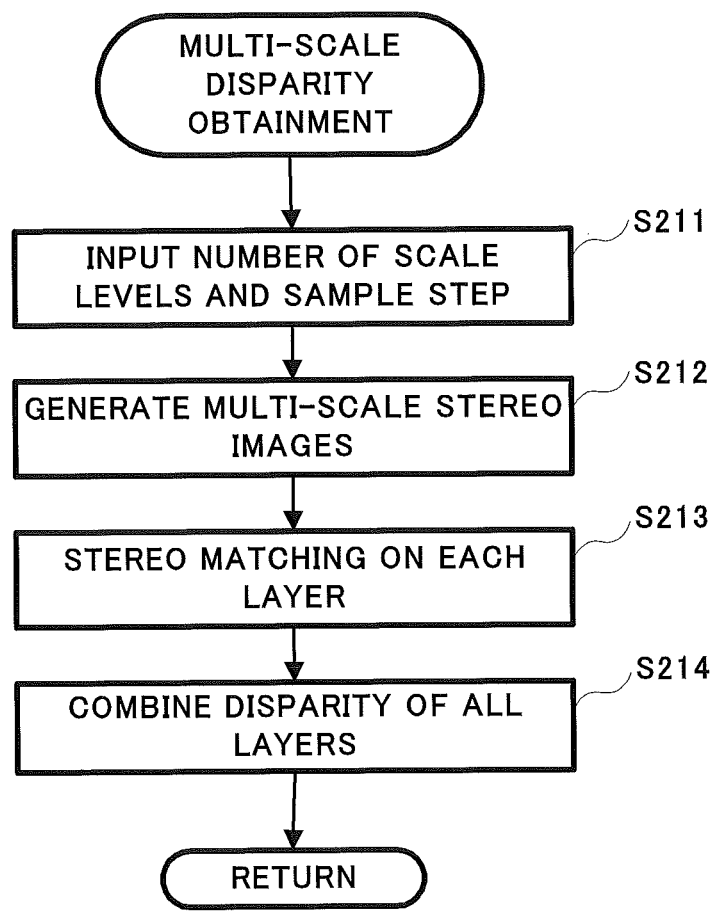
FIG. 24 is a flowchart illustrating the details of multi-scale stereo disparity calculation process according to the second embodiment.

With reference to FIG. 24, the process of obtaining the multi-scale stereo disparity in the above-explained step S210 will be explained.

The multi-scale stereo disparity calculating unit 140 acquires the number of scale levels and the sample step for producing each layer stored in advance in the processing rule memory 31 (step S211), generates stereo images in multi-scales for both right and left images based on the input parameters (the number of scale levels and the sample step) (step S212), and performs stereo matching on each layer (step S213). Next, the combining process of the disparity on all the layers is performed (step S214). That is, the disparity information on all the layers is combined to obtain the stereo disparity in the stereo images of the original size.

(Third Embodiment)

Next, a detailed explanation will be given about a third embodiment of the present invention with reference to the drawings.

Figure 25:
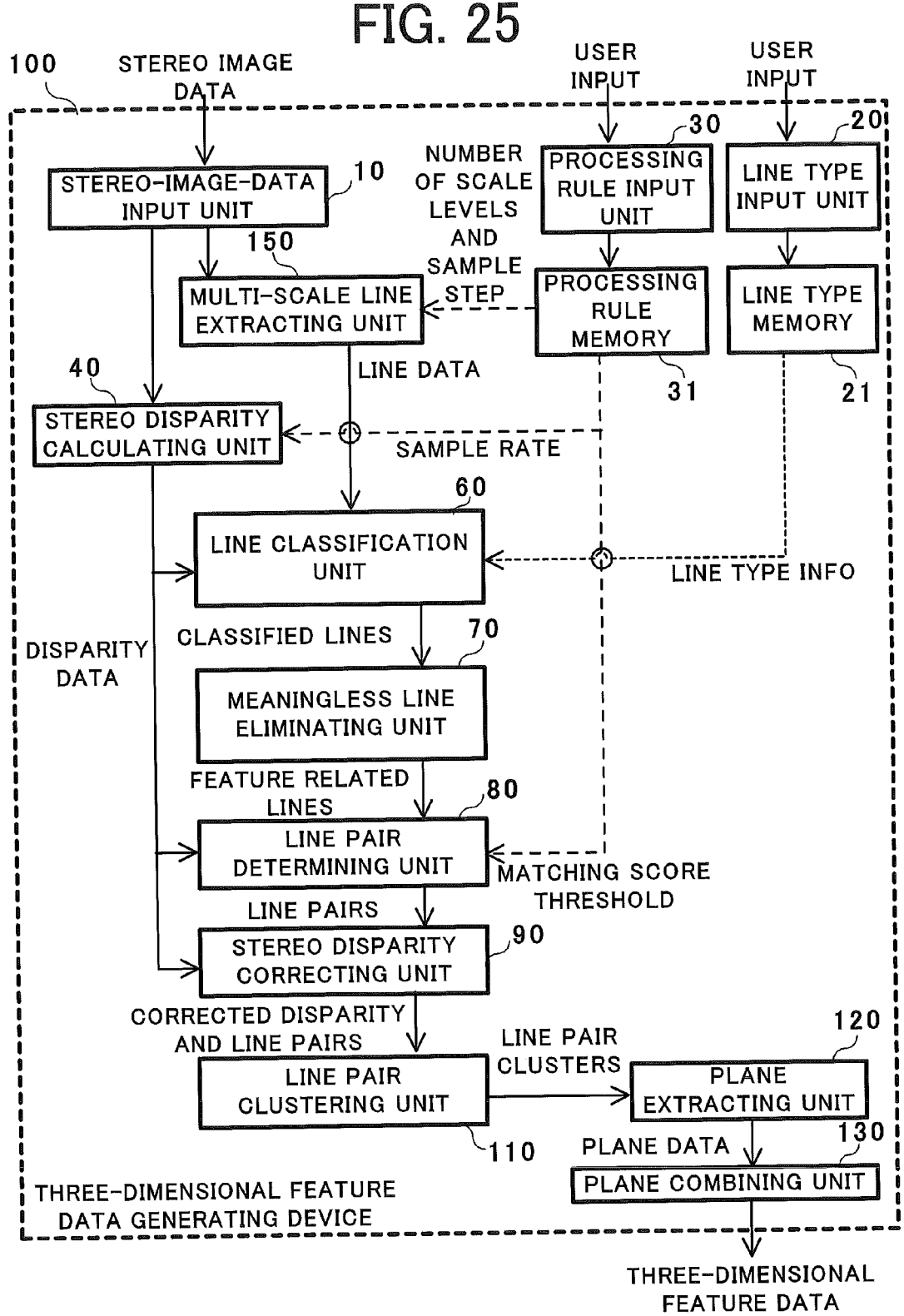
FIG. 25 is a block diagram illustrating the general structure of a three-dimensional feature data generating device according to a third embodiment.

The block diagram of FIG. 25 illustrates the general structure of a three-dimensional feature data generating device 100 according to the third embodiment of the present invention.

With reference to FIG. 25, the third embodiment of the present invention differs from the first embodiment illustrated in FIG. 1 that the line extracting unit 50 of the first embodiment is replaced with a multi-scale line extracting unit 150. Moreover, the third embodiment also differs from the second embodiment in such a way.

The multi-scale line extracting unit 150 extracts lines from a multi-scale image pyramid with respect to the image of each layer, and eventually applies certain limitation to the lines from respective layer, and outputs the combined result as one line set.

The line set extracted from a multi-scale image pyramid has fewer noise lines in comparison with the result from the single scale image, and lines extracted from multi-scale images are more related to real world, for example, contour lines of a building with good connecting characteristic.

Various techniques are applicable to realize the above explained process, but the technique applied in this embodiment is not limited to any particular one. For example, a Multiscale Line Detection technique is applicable.

In the third embodiment, the basic function of the processing rule input unit 30 is the same as that of the first embodiment. However, unlike the first embodiment, parameters used for multi-scale line extraction are the number of scale levels and the sample step for producing each layer, which are input through the processing rule input unit 30. Moreover, the process parameters for line pair determination are the same as those of the first embodiment, and thus the explanation thereof will be omitted.

The physical structure for the three-dimensional feature data generating device 100 of the third embodiment implemented in a computer is basically the same as the structure of the first embodiment illustrated in the block diagram of FIG. 6, and thus the explanation thereof will be omitted.

Next, a detailed explanation will be given about the operation of the three-dimensional feature data generating device 100 according to the third embodiment with reference to the drawings.

Figure 26:
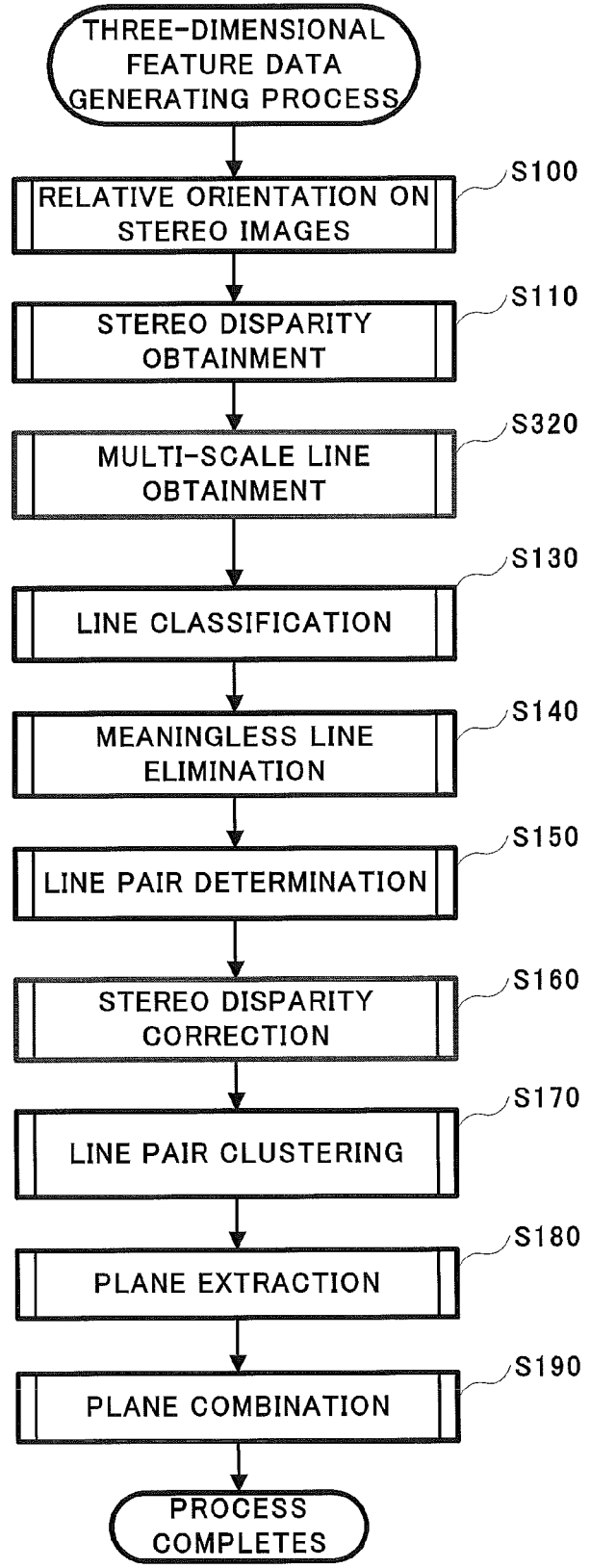
FIG. 26 is a flowchart illustrating the whole flow of a three-dimensional feature data generating process according to the third embodiment.

First, an overall flow of the process will be explained with reference to FIG. 26. FIG. 26 is a flowchart illustrating a three-dimensional feature data generating process according to the third embodiment.

Like the first embodiment, when stereo image data is input in the stereo image data input unit 10, line type information is input in the line type input unit 20, and process parameters are input in the processing rule input unit 30, respectively, the three-dimensional feature data generating process illustrated in FIG. 26 starts.

The process of each step in the flow of the overall process is the same as that of the first embodiment other than the obtainment of multi-scale lines (step S320), and thus the explanation thereof will be omitted.

Figure 27:
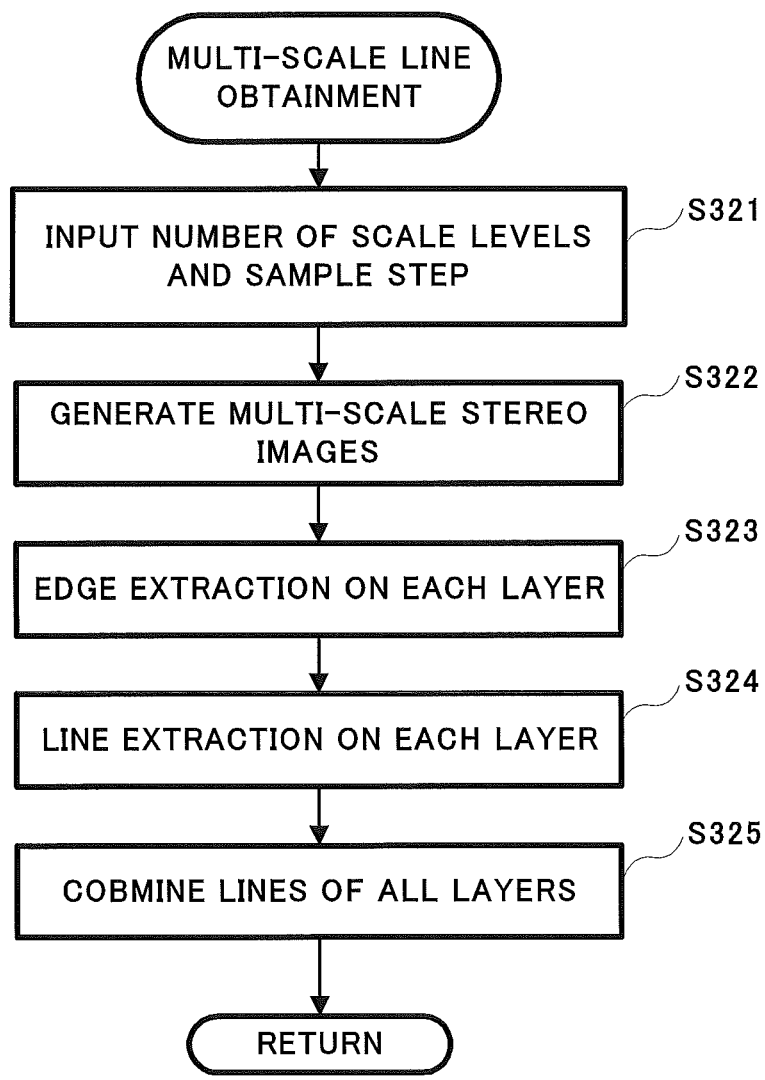
FIG. 27 is a flowchart illustrating the details of multi-scale line extraction process according to the third embodiment.

With reference to FIG. 27, the process of obtaining multi-scale lines in the above-explained step S320 will be explained.

The multi-scale line extracting unit 150 acquires the number of scale levels and the sample step stored in advance in the processing rule memory 31 (step S321), generates multi-scale images for both right and left images based on input parameters (the number of scale levels and the sample step) (step S322), extracts the edges on each layer (step S323), and extracts the lines on each layer (step S324). Next, the multi-scale line extracting unit performs a combining process of lines on all the layers (step S325). That is, lines extracted on each layer are combined to finally obtain one set of lines.

(Fourth Embodiment)

Next, a detailed explanation will be given about a fourth embodiment of the present invention with reference to the drawings.

Figure 28:
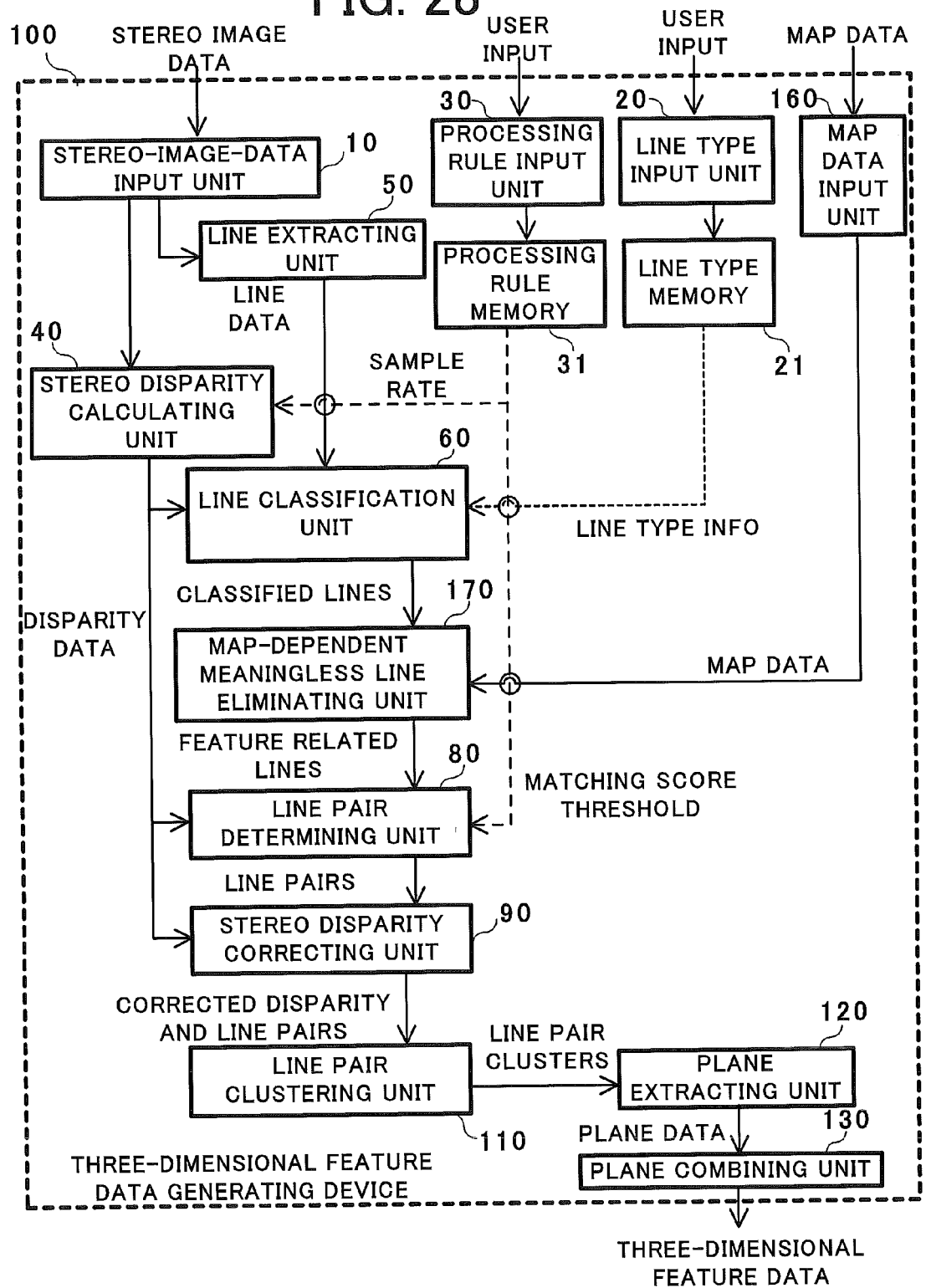
FIG. 28 is a block diagram illustrating the general structure of a three-dimensional feature data generating device according to a fourth embodiment.

The block diagram of FIG. 28 illustrates the general structure of a three-dimensional feature data generating device 100 according to the fourth embodiment of the present invention.

With reference to FIG. 28, the fourth embodiment of the present invention differs from the first embodiment illustrated in FIG. 1 that the meaningless line eliminating unit 70 of the first embodiment is replaced with a map-dependent meaningless line eliminating unit 170, and a map data input unit 160 is added. Moreover, the fourth embodiment differs from the second embodiment and the third embodiment in those points.

The map data input unit 160 has the function of inputting map data as the auxiliary data for defining an effective area to remove noise lines.

The map data is the data including geographical information on features within an area to be processed, such as location, range, and shape information of buildings, roads, rivers, green spaces, and trees.

The map data utilized in the present invention can be any map data reflecting geographical information on the terrain and features based on longitude and latitude information with certain precision, for example, commercially available map, national base map, topographic map, and the like.

Figure 29:
FIG. 29 is a diagram illustrating an example of map data.

More specifically, an example of the national base map is illustrated in FIG. 29, which is also applicable. In the map data illustrated in FIG. 29, various topographic structures such as residential districts with densely distributed residential buildings, roads, railways, rivers, and green spaces can be found. FIG. 29 is monochrome due to the regulation of drawings to be filed, but in practice, map data to be used is represented with colors, and respective topographic structure, such as residential buildings, ponds, and green spaces, is distinguished by different colors.

In this embodiment, an explanation will be given about an example case in which map data (digital map data) illustrated in FIG. 29 is utilized.

Note that the map data utilized in the present invention may be a vector map having longitude and latitude information in the form of coordinates for each point on the contour line of an architectural structure, a road, or a river, and may also be a raster map with a certain scale.

Moreover, for the terrain or each feature, its related symbol information indicative of an actual place like a town name or a river name may be added. When the symbol information is added, it becomes an aid to determine whether the terrain or feature should be processed or not.

The map-dependent meaningless line eliminating unit 170 applies a technique of eliminating meaningless lines based on the map information. It is possible that the stereo aerial photographs to be processed contain various landforms besides residential buildings and architectural structures. Compared with an effective area where a residential building or an architectural structure exists, an area without any residential buildings or architectural structures should be omitted for the process of the present invention. If the ineffective area can be clearly distinguished from the effective area, all the lines in the ineffective area can be eliminated as meaningless lines, and the following process becomes more efficiently.

Water areas, such as a river, a pond, and an ocean, not including a residential building or an architectural structure, and normally occupy independent areas from other features, and thus such water areas can be extracted as ineffective areas for the three-dimensional model generating process. Moreover, green spaces with certain area in an urban district, such as a park, a woodland, a rice field, and a farmland, can be eliminated as ineffective areas from the three-dimensional model generating process too.

In addition, topographic structure unrelated to a residential building or an architectural structure, such as a road, a railway, a tree at a side of a road, often exists in the surroundings of residential buildings and architectural structures. Accordingly, such unrelated topographic structures cannot be simply segmented from a region also including residential buildings or architectural structures only based on the map information. For such topographic structures, the process of obtaining effective areas and ineffective areas is not performed.

In comparison, for the area clearly dividable from residential buildings or architectural structures, such as a water area or a green space, a contour line of such an area can be manually drawn, or in a more efficient way, by automatic extraction based on the combination of aerial photograph and map data. After determining the water area and the green space in the map, by superimposing the map on the aerial photograph, these areas can be reflected on the aerial photograph, and can be automatically extracted on the aerial photograph.

Together with aerial photographs, the information acquired from aerial image shooting are the coordinates of the image center point indicating the location of the aerial photograph in the real world, the angle of the posture of the airplane indicating the azimuth of the aerial photograph in the real world, the size and the resolution which set the range of the aerial photograph in the real world.

For example, for a pair of stereo aerial photographs, firstly aerial triangulation is performed based on the coordinates of the image center and the angle of the posture of the airplane at image shooting, and then relative orientation of stereo images is performed. Subsequently, the geometric transform is performed on the map, and the correspondence relationship of the same point on the map and on the image is found out to make the map and the image ready for superimposing.

In order to register with the image, geometrical transform is performed on the map. Basically, on the basis of the image shooting information and the image contents, the map is transformed through, for example, affine transformation to register with the image describing the same area.

Different topographic structures are normally represented with different colors on a map. The map illustrated in FIG. 29 explained above is expressed in a monochrome manner due to the regulation of the drawings to be filed, but in the actual colored map, the following information is available. That is, a building is represented in gray, a normal road is represented in white, a major road is represented in yellow, a water area is represented in blue, and a green space is represented in green. Based on such color information, different topographic structures are distinguishable, and the range of each topographic structure is also determinable. With the registration of the map and the image obtained in advance, contour lines of the extracted water area and green space can be directly shown on the image.

In the case of a vector map, normally, the area of each topographic structure is represented by a polygon, and color information is stored as an attribute of the polygon. Hence, a topographic structure like a water area or a green space can be easily determined based on the color information. However, since the contour of the area is not directly applicable to the aerial photograph as a vector, it is necessary at first to find each pixel at the same location in the aerial photograph and convert it into a contour line pixel. Conversely, in the case of a raster map image, the image is segmented based on color information, the contour line of a water area or a green space is extracted as pixels, and thus can be directly reflected on the aerial photograph.

The physical structure of the three-dimensional feature data generating device 100 of the fourth embodiment implemented in a computer is basically the same as the structure of the first embodiment illustrated in the block diagram of FIG. 6. However, the following points are different from the first embodiment.

Data input through the input/output unit 202 includes, not only the image data to be processed, the process parameters, the process way, and the line type information but also the map data.

Data displayed on the display 203 includes, not only the input image data and the processing result by the three-dimensional feature data generating device 100 but also the map data.

Data input through the operation unit 204 includes, not only the stereo image data, the process parameters, and the line type information explained in the first embodiment, but also the map data.

Next, a detailed explanation will be given about the operation of the three-dimensional feature data generating device 100 of the fourth embodiment with reference to the drawings.

Figure 30:
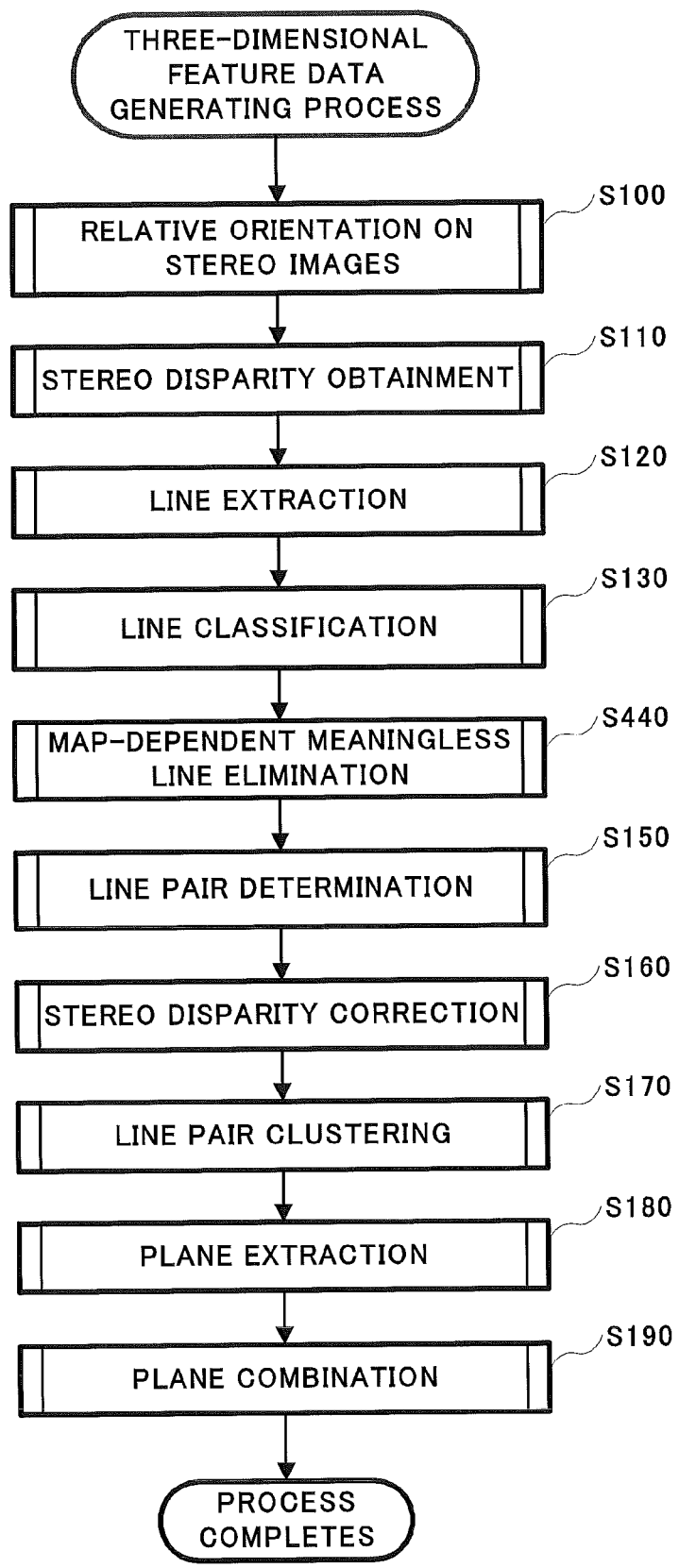
FIG. 30 is a flowchart illustrating the whole flow of a three-dimensional feature data generating process according to the fourth embodiment.

First, an overall flow of the process will be explained with reference to FIG. 30. FIG. 30 is a flowchart illustrating a three-dimensional feature data generating process according to the fourth embodiment.

Like the first embodiment, when stereo image data is input through the stereo image data input unit 10, the line type information is input through the line type input unit 20, the map data is input through the map data input unit 160, and the process parameters are input through the processing rule input unit 30, respectively, the three-dimensional feature data generating process in FIG. 30 starts.

The process at each step in the flow of the overall process is the same as that of the first embodiment other than the map-dependent meaningless line eliminating process (step S440), and thus the explanation thereof will be omitted.

Figure 31:
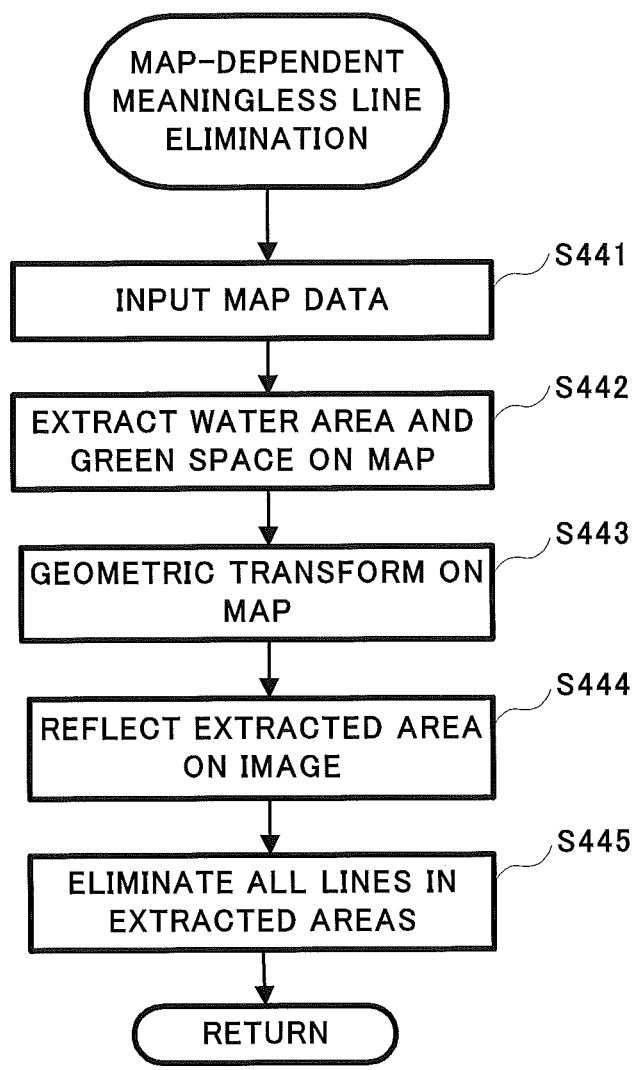
FIG. 31 is a flowchart illustrating the details of map-dependent meaningless line eliminating process according to the fourth embodiment.

An explanation will be given of the map-dependent meaningless line eliminating process in the above-explained step S440 with reference to FIG. 31.

The map-dependent meaningless line eliminating unit 170 acquires map data through the map data input unit 160 (step S441), extracts water areas and green spaces on the map (areas unrelated to features, such as a residential building and an architectural structure) (step S442), performs geometric transform on the map to register with the image (step S443), and reflects the extracted areas from the map on the image (step S444). Next, lines in the extracted areas are eliminated (step S445). That is, all the lines in the areas including the water areas and the green space in the image are eliminated.

When the techniques explained in the second to fourth embodiments are applied, the three-dimensional feature data generating device 100 is capable of generating a three-dimensional model of each feature inside an area where the residential buildings or the architectural structures to be processed exist based on stereo information from several images taken at different viewpoints from the sky, and inherent line type information on the residential building or the architectural structure.

That is, the three-dimensional feature data generating device 100 of the second embodiment calculates the disparity in multiple scales, and utilizes the multi-scale disparity calculating unit to eventually obtain the disparity on the stereo images in the original size. Therefore, more precise disparity can be obtained than the disparity calculation in the single scale manner.

Moreover, the three-dimensional feature data generating device 100 of the third embodiment extracts the lines in multiple scales, and utilizes the multi-scale line extracting unit to eventually output the set of lines that is the combined result of lines from all the image layers. Therefore, the number of noise lines is reduced in comparison with the line extraction in the single scale manner, and the connecting characteristics of the extracted lines also become better.

Furthermore, the three-dimensional feature data generating device 100 of the fourth embodiment utilizes map information when eliminating meaningless lines. By determining an area unrelated to residential buildings or architectural structures as an ineffective area, all the lines in the ineffective area can be eliminated as meaningless lines. Therefore, the meaningless line elimination can be executed more efficiently.

A part of or all of the above-explained embodiments are describable as the following additional notes, but the present invention is not limited to the additional notes.

(Additional Note 1)

A three-dimensional feature data generating device that generates three-dimensional data of a feature, i.e. a residential building, an architectural structure and the like, from stereo images, and the three-dimensional feature data generating device includes:

a stereo disparity calculating unit that calculates predicted value of stereo disparity relating to height information of the terrain and all the features;

a line extracting unit that extracts the lines from an image, which are characteristic lines representing the internal structure of the rooftop of each feature, contour lines representing the external shape of each feature, and characteristic lines of each non-feature object;

a line classification unit that classifies the lines extracted by the line extracting unit into three classes according to their respective meaning in the real world, i.e., the internal rooftop lines of features, external contour lines of features, and contour lines of shadow areas;

a meaningless line eliminating unit that eliminates the lines that do not exist in the real world but are generated due to the influence of shadow or image noise;

a line pair determining unit that determines, for each line in one image of the stereo image pair, its corresponding line in another image of the stereo image pair, based on the disparity information from the stereo disparity calculating unit, the color and texture distribution patterns of the neighboring region around each line, and also the line classification result;

a stereo disparity correcting unit that calculates more precise disparity value based on the correspondence relationship of each line pair obtained by the line pair determining unit, to correct the predicted stereo disparity value obtained by the stereo disparity calculating unit;

a line pair clustering unit that firstly selects, among all the line pairs obtained by the line pair determining unit, only the line pairs related to features including a residential building, an architectural structure and the like, and then utilizes both the disparity information of each line pair and the geometrical relationship of several line pairs to finally cluster the line pairs belonging to the same feature as one line pair cluster;

a plane extracting unit that extracts basic planes configuring a feature based on the geometrical relationship and disparity information of the line pairs in each line pair cluster obtained by the line pair clustering unit; and a plane combining unit that calculates the three-dimensional relative location relationship between the planes of each feature extracted by the plane extracting unit to generate a three-dimensional model representing the whole structure of each feature.

(Additional Note 2)

The three-dimensional feature data generating device described in additional note 1, in which the stereo disparity calculating unit predicts the disparity and the relative height information of the terrain and all the features in the image based on the stereo images.

(Additional Note 3)

The three-dimensional feature data generating device described in additional note 1 or 2, in which the stereo disparity calculating unit obtains the down-sampled stereo images at certain sample rate of the current processing stereo images in accordance with the application requirements, calculates the disparity from the down-sampled stereo images, and maps the disparity in the down-sampled stereo images to the stereo images in the original size, and thus obtains the predicted value of the disparity in the whole image.

(Additional Note 4)

The three-dimensional feature data generating device described in any one of additional notes 1 to 3, in which the stereo disparity calculating unit generates the down-sampled stereo images in multiple scales of the current processing stereo images, calculates the disparity on each scale, and combines the disparity information of multiple scales to obtain the predicted value of the disparity in the image of the original size.

(Additional Note 5) The three-dimensional feature data generating device described in additional note 1, in which the line extracting unit extracts lines from one image of the stereo images based on the edges extracted through certain image processing technique.

(Additional Note 6)

The three-dimensional feature data generating device described in additional note 1 or 5, in which the multi-scale line extracting unit constructs an image pyramid from several downs-sampled images obtained in a multi-scale manner from one image of the stereo images, extracts lines from the image of each layer on the image pyramid, combines the extracted lines from multiple image layers under certain limitation to finally output one set of lines in the image of the original size.

(Additional Note 7)

The three-dimensional feature data generating device described in any one of additional notes 1 to 6, in which the line classification unit classifies, based on the disparity obtained by the stereo disparity calculating unit and the input stereo images, the lines extracted by the line extracting unit into two classes as the lines related to features and the lines unrelated to features.

(Additional Note 8)

The three-dimensional feature data generating device described in any one of additional notes 1 to 7, in which the line classification unit selects the lines related to features from all the lines extracted by the line extracting unit and based on the disparity obtained by the stereo disparity calculating unit, the input stereo images, and further the different characteristics of lines regarding the rooftop structure, classifies the lines related to features into two classes, i.e. the internal rooftop lines of features, and the external contour lines of features.

(Additional Note 9)

The three-dimensional feature data generating device described in any one of additional notes 1 to 8, in which the line classification unit selects the lines unrelated to features from all the lines extracted by the line extracting unit and based on the disparity obtained by the stereo disparity calculating unit and the input stereo images, classifies the lines unrelated to features into three classes, i.e., contour lines of shadow areas, road lines, and other lines.

(Additional Note 10) The three-dimensional feature data generating device described in any one of additional notes 1 to 9, in which the line classification unit classifies the lines extracted by the line extracting unit in accordance with specific application requirements from the users based on the disparity obtained by the stereo disparity calculating unit and the input stereo images.

(Additional Note 11) The three-dimensional feature data generating device described in any one of additional notes 1 to 10, in which the line classification unit classifies the lines extracted by the line extracting unit in accordance with a classification rule generated from the combination of multiple classification standards based on the disparity obtained by the stereo disparity calculating unit and the input stereo images.

(Additional Note 12)

The three-dimensional feature data generating device described in additional note 1, 5 or 6, in which the meaningless line eliminating unit eliminates the lines produced due to the influence of image noise and shadow regions from the set of all the lines extracted by the line extracting unit, including not only the above eliminated lines but also the lines with meanings in the real world.

(Additional Note 13)

The three-dimensional feature data generating device described in additional note 1, 5, 6 or 12, in which the meaningless line eliminating unit receives map information input from outside that includes the same area as that represented in the stereo images, registers the map with the stereo images to assure their correspondence relationship of the same location, determines the ineffective areas based on the map information, and eliminates all the lines in the ineffective areas as noise lines.

(Additional Note 14)

The three-dimensional feature data generating device described in additional note 1, 5, 6, 12 or 13, in which the meaningless line eliminating unit eliminates noise lines defined in accordance with specific application requirements by the users from all the lines extracted by the line extracting unit.

(Additional Note 15)

The three-dimensional feature data generating device described in additional note 1, 5, 6, 7, 8, 9, 10 or 11, in which the line pair determining unit determines, based on the line types classified by the line classification unit, for each line extracted by the line extracting unit in one image of the stereo images, when searching for its corresponding line in another image, whether a line of the same line type as the current processing line in another image is the corresponding line or not according to the criteria including matching score.

(Additional Note 16)

The three-dimensional feature data generating device described in additional note 1, 5, 6, 7, 8, 9, 10 11, or 15 in which the line pair determining unit sets, for part of or all of the lines extracted by the line extracting unit from one image of the stereo images, respectively its corresponding line in another image by the users.

(Additional Note 17)

The three-dimensional feature data generating device described in additional note 1, 2, 3, 4, 15 or 16, in which the stereo disparity correcting unit obtains more precise disparity with the correspondence relationship of the line pairs obtained by the line pair determining unit as matching constraints for the other points on the same epipolar line in the right and left images, and thus corrects the predicted value of the disparity obtained by the stereo disparity calculating unit.

(Additional Note 18)

The three-dimensional feature data generating device described in additional note 1, 2, 3, 4, 15, 16 or 17, in which the stereo disparity correcting unit utilizes the correspondence relationship of the line pairs obtained by the line pair determining unit as the matching constraints for the other points on the same epipolar line, to determine more precisely the range of occlusion areas existing near features with certain height, and thus correct the predicted value of the disparity obtained by the stereo disparity calculating unit.

(Additional Note 19)

The three-dimensional feature data generating device described in additional note 1, 15, 16, 17 or 18, in which the line pair clustering unit selects, among the line pairs obtained by the line pair determining unit, the line pairs related to features, and utilizes the disparity obtained by the stereo disparity correcting unit and the geometrical relationship between multiple line pairs to cluster all the line pairs belonging to one feature as a cluster.

(Additional Note 20)

The three-dimensional feature data generating device described in additional note 1, 15, 16, 17, 18 or 19, in which the line pair clustering unit, for each line pair obtained by the line pair determining unit, based on the condition that the line pairs belonging to the same feature need to satisfy specific application requirements from the users, determines the belonging relationship of the line pair in accordance with the application requirements.

(Additional Note 21)

The three-dimensional feature data generating device described in additional note 1, 15, 16, 17, 18, 19 or 20, in which the plane extracting unit, based on the disparity information obtained by the stereo disparity correcting unit and the disparity distribution patterns in the neighboring region of each line pair, extracts the planes from the cluster of line pairs belonging to each feature obtained by the line pair determining unit under the plane constraints.

(Additional Note 22)

The three-dimensional feature data generating device described in additional note 1, 15, 16, 17, 18, 19, 20 or 21, in which the plane extracting unit, based on the disparity information obtained by the stereo disparity correcting unit, and the disparity distribution patterns in the neighboring region of each line pair, extracts the planes from the cluster of line pairs belonging to each feature obtained by the line pair determining unit under the plane constraints and also the smoothness of the color distribution patterns on the plane or that of the texture distribution patterns as constraints.

(Additional Note 23)

The three-dimensional feature data generating device described in additional note 1, 17, 18, 21 or 22, in which the plane combining unit generates the three-dimensional rooftop structure of each feature based on all the planes forming the rooftop, which are extracted by the plane extracting unit, and utilizes the disparity information obtained by the stereo disparity correcting unit to generate the three-dimensional model of the feature.

(Additional Note 24)

A three-dimensional feature data generating method for generating three-dimensional data of a feature, i.e. a residential building, an architectural structure and the like, from stereo images, and the three-dimensional feature data generating method includes:

a stereo disparity calculating step for calculating predicted value of stereo disparity relating to height information of the terrain and all the features;

a line extracting step for extracting the lines from an image, which are characteristic lines representing the internal structure of the rooftop of each feature, contour lines representing the external shape of each feature, and characteristic lines of each non-feature object;

a line classification step for classifying the lines extracted through the line extracting step into three classes according to their respective meaning in the real world, i.e., the internal rooftop lines of features, external contour lines of features, and contour lines of shadow areas;

a meaningless line eliminating step for eliminating the lines that do not exist in the real world but are generated due to the influence of shadow or image noise;

a line pair determining step for determining, for each line in one image of the stereo image pair, its corresponding line in another image of the stereo image pair, based on the disparity information from the stereo disparity calculating step, the color and texture distribution patterns of the neighboring region around each line, and also the line classification result;

a stereo disparity correcting step for calculating more precise disparity value based on the correspondence relationship of each line pair obtained through the line pair determining step, to correct the predicted stereo disparity value obtained through the stereo disparity calculating step;

a line pair clustering step for firstly selecting, among all the line pairs obtained through the line pair determining step, only the line pairs related to features including a residential building, an architectural structure and the like, and then utilizing both the disparity information of each line pair and the geometrical relationship of several line pairs to finally cluster the line pairs belonging to the same feature as one line pair cluster;

a plane extracting step for extracting basic planes configuring a feature based on the geometrical relationship and disparity information of the line pairs in each line pair cluster obtained through the line pair clustering step; and a plane combining step for calculating the three-dimensional relative location relationship between the planes of each feature extracted through the plane extracting step to generate a three-dimensional model representing the whole structure of each feature.

(Additional Note 25)

A recording medium having stored therein a three-dimensional feature data generating program that causes a computer to function as:

a stereo disparity calculating unit that calculates predicted value of stereo disparity relating to height information of the terrain and all the features;

a line extracting unit that extracts the lines from an image, which are characteristic lines representing the internal structure of the rooftop of each feature, contour lines representing the external shape of each feature, and characteristic line of each non-feature object;

a line classification unit that classifies the lines extracted by the extracting unit into three classes according to their respective meaning in the real world, i.e., the internal rooftop lines of features, external contour lines of features, and contour lines of shadow areas;

a meaningless line eliminating unit that eliminates the lines that do not exist in the real world but are generated due to the influence of shadow or image noise;

a line pair determining unit that determines, for each line in one image of the stereo image pair, its corresponding line in another image of the stereo image pair, based on the disparity information from the stereo disparity calculating unit, the color and texture distribution patterns of the neighboring region around each line, and also the line classification result;

a stereo disparity correcting unit that calculates more precise disparity value based on the correspondence relationship of each line pair obtained by the line pair determining unit, to correct the predicted stereo disparity value obtained by the stereo disparity calculating unit;

a line pair clustering unit that firstly selects, among all the line pairs obtained by the line pair determining unit, only the line pairs related to features including a residential building, an architectural structure and the like, and then utilizes both the disparity information of each line pair and the geometrical relationship of several line pairs to finally cluster the line pairs belonging to the same feature as one line pair cluster;

a plane extracting unit that extracts basic planes configuring a feature based on the geometrical relationship and disparity information of the line pairs in each line pair cluster obtained by the line pair clustering unit; and a plane combining unit that calculates the three-dimensional relative location relationship between the planes of each feature extracted by the plane extracting unit to generate a three-dimensional model representing the whole structure of each feature.

The present invention can employ various embodiments and modifications without departing from the broadest scope and spirit of the present invention. Moreover, the above-explained embodiments are for explaining the present invention, and are not for limiting the scope and spirit of the present invention. That is, the scope and spirit of the present invention should be indicated by appended claims rather than the embodiments. Various modifications within the scope of the appended claims and the equivalent range thereto should also be within the scope and spirit of the present invention.

This application is based on Japanese Patent Application No. 2011-143835 filed on Jun. 29, 2011. The whole specification, claims, and drawings of Japanese Patent Application No. 2011-143835 are herein incorporated in this specification by reference.

INDUSTRIAL APPLICABILITY

As explained above, there are provided a three-dimensional feature data generating device, a three-dimensional feature data generating method, and a program which are capable of generating highly precise three-dimensional feature data that reflects the detailed rooftop structure at low costs.

REFERENCE SIGNS LIST

100 Three-dimensional feature data generating device
10 Stereo image data input unit
20 Line type input unit
21 Line type memory
30 Processing rule input unit
31 Processing rule memory
40 Stereo disparity calculating unit
50 Line extracting unit
60 Line classification unit
70 Meaningless line eliminating unit
80 Line pair determining unit
90 Stereo disparity correcting unit
110 Line pair clustering unit
120 Plane extracting unit
130 Plane combining unit
140 Multi-scale stereo disparity calculating unit
150 Multi-scale line extracting unit
160 Map data input unit
170 Map-dependent meaningless line eliminating unit
201 Controller
202 Input/output unit
203 Display
204 Operation unit
205 Main memory
206 External memory
207 System bus
300 Control program

The invention claimed is:

1. A three-dimensional feature data generating device that generates three-dimensional data of a feature, from stereo images, and the three-dimensional feature data generating device includes:

a stereo disparity calculating unit that calculates a predicted value of stereo disparities between pixels on the stereo images relating to height information of a terrain and features;
a line extracting unit that extracts lines from an image, which are characteristic lines representing an internal structure of a rooftop of each feature, contour lines representing an external shape of each feature, and characteristic lines of each non-feature object;
a line classification unit that classifies the lines extracted by the line extracting unit into three classes according to their respective meaning in the real world, including any of internal rooftop lines of features, external contour lines of features, and contour lines of shadow areas;
a meaningless line eliminating unit that eliminates the lines that do not exist in the real world but are generated due to an influence of shadow or image noise;
a line pair determining unit that determines, for each line in one image of a stereo image pair, its corresponding line in another image of the stereo image pair, based on disparity information from the stereo disparity calculating unit, color and texture distribution patterns of a neighboring region around each line, and a line classification result;
a stereo disparity correcting unit that calculates a more precise value of disparities between pixels on the stereo images based on a correspondence relationship of each line pair obtained by the line pair determining unit, to correct the predicted value of stereo disparities between pixels on the stereo images obtained by the stereo disparity calculating unit;
a line pair clustering unit that firstly selects, among the line pairs obtained by the line pair determining unit, only the line pairs related to features including a residential building, an architectural structure and the like, and then utilizes both the disparity information of each line pair and a geometrical relationship of several line pairs to finally cluster the line pairs belonging to the same feature as one line pair cluster;
a plane extracting unit that extracts basic planes configuring a feature based on the geometrical relationship and disparity information of the line pairs in each line pair cluster obtained by the line pair clustering unit; and
a plane combining unit that calculates a three-dimensional relative location relationship between planes of each feature extracted by the plane extracting unit to generate a three-dimensional model representing the whole structure of each feature.

2. The three-dimensional feature data generating device according to claim 1, wherein the stereo disparity calculating unit generates down-sampled stereo images in multiple scales of current processing stereo images, calculates a value of disparities between pixels on the stereo images on each scale, and combines disparity information of multiple scales to obtain a predicted value of a disparities between pixels on the stereo images in the image of an original size.

3. The three-dimensional feature data generating device according to claim 1, wherein a multi-scale line extracting unit constructs an image pyramid from several down-sampled images obtained in a multi-scale manner from one image of the stereo images, extracts lines from the image of each layer on the image pyramid, combines the extracted lines from multiple image layers under certain limitation to finally output one set of lines in the image of an original size.

4. The three-dimensional feature data generating device according to claim 1, wherein the line classification unit classifies, based on a disparity information obtained by the stereo disparity calculating unit and input stereo images, the lines extracted by the line extracting unit into two classes as the lines related to features, and the lines unrelated to features, and further based on the different characteristics of lines regarding the rooftop structure, classifies the lines related to features into two classes, including any of the internal rooftop lines of features, and the external contour lines of features; and also further classifies the lines unrelated to features into three classes, including any of contour lines of shadow areas, road lines, and other lines.

5. The three-dimensional feature data generating device according to claim 1, wherein the meaningless line eliminating unit eliminates the lines produced due to the influence of image noise and shadow regions from the set of all the lines extracted by the line extracting unit, including not only the above eliminated lines but also the lines with meanings in the real world.

6. The three-dimensional feature data generating device according to claim 1, wherein the meaningless line eliminating unit receives map information input from outside that includes the same area as that represented in the stereo images, registers the map with the stereo images to assure their correspondence relationship of the same location, determines the ineffective areas based on the map information, and eliminates all the lines in the ineffective areas as noise lines.

7. The three-dimensional feature data generating device according to claim 1, wherein the line pair determining unit determines, based on the line types classified by the line classification unit, for each line extracted by the line extracting unit in one image of the stereo images, when searching for its corresponding line in another image, whether a line of the same line type as the current processing line in another image is the corresponding line or not according to the criteria including matching score.

8. The three-dimensional feature data generating device according to claim 1, wherein the line pair clustering unit selects, among the line pairs obtained by the line pair determining unit, the line pairs related to features, and utilizes the disparity obtained by the stereo disparity correcting unit and the geometrical relationship between multiple line pairs to cluster all the line pairs belonging one feature as a cluster.

9. A three-dimensional feature data generating method for generating three-dimensional data of a feature, from stereo images, and the three-dimensional feature data generating method includes:
   a stereo disparity calculating step for calculating a predicted value of stereo disparities between pixels on the stereo images relating to height information of the terrain and features;
   a line extracting step for extracting lines from an image, which are characteristic lines representing an internal structure of a rooftop of each feature, contour lines representing an external shape of each feature, and characteristic lines of each non-feature object;
   a line classification step for classifying the lines extracted through the line extracting step into three classes according to their respective meaning in the real world, including any of internal rooftop lines of features, external contour lines of features, and contour lines of shadow areas;
   a meaningless line eliminating step for eliminating the lines that do not exist in the real world but are generated due to an influence of shadow or image noise;
   a line pair determining step for determining, for each line in one image of a stereo image pair, its corresponding line in another image of the stereo image pair, based on disparity information from the stereo disparity calculating step, color and texture distribution patterns of a neighboring region around each line, and a line classification result;
   a stereo disparity correcting step for calculating a more precise value of disparities between pixels on the stereo images based on a correspondence relationship of each line pair obtained through the line pair determining step, to correct the predicted value of stereo disparities between pixels on the stereo images value obtained through the stereo disparity calculating step;
   a line pair clustering step for firstly selecting, among the line pairs obtained through the line pair determining step, only the line pairs related to features including a residential building, an architectural structure and the like, and then utilizing both the disparity information of each line pair and a geometrical relationship of several line pairs to finally cluster the line pairs belonging to the same feature as one line pair cluster;
   a plane extracting step for extracting basic planes configuring a feature based on the geometrical relationship and disparity information of the line pairs in each line pair cluster obtained through the line pair clustering step; and
   a plane combining step for calculating a three-dimensional relative location relationship between planes of each feature extracted through the plane extracting step to generate a three-dimensional model representing the whole structure of each feature.

10. A non-transitory tangible computer-readable recording medium having stored therein a three-dimensional feature data generating program that causes a computer to function as:
   a stereo disparity calculating unit that calculates a predicted value of stereo disparities between pixels on a stereo images relating to height information of the terrain and features;
   a line extracting unit that extracts lines from an image, which are characteristic lines representing an internal structure of a rooftop of each feature, contour lines representing an external shape of each feature, and a characteristic line of each non-feature object;
   a line classification unit that classifies the lines extracted by the extracting unit into three classes according to their respective meaning in the real world;
   a meaningless line eliminating unit that eliminates the lines that do not exist in the real world but are generated due to an influence of shadow or image noise;
   a line pair determining unit that determines, for each line in one image of the stereo image pair, its corresponding line in another image of the stereo image pair, based on disparity information from the stereo disparity calculating unit, color and texture distribution patterns of the neighboring region around each line, and a line classification result;
   a stereo disparity correcting unit that calculates a more precise value of disparities between pixels on the stereo images based on the correspondence relationship of each line pair obtained by the line pair determining unit, to correct the predicted value of stereo between pixels on the stereo images obtained by the stereo disparity calculating unit;
   a line pair clustering unit that firstly selects, among the line pairs obtained by the line pair determining unit, only the line pairs related to features including a residential building, an architectural structure and the like, and then utilizes both the disparity information of each line pair and a geometrical relationship of several line pairs to finally cluster the line pairs belonging to the same feature as one line pair cluster;
a plane extracting unit that extracts basic planes configuring a feature based on the geometrical relationship and disparity information of the line pairs in each line pair cluster obtained by the line pair clustering unit; and
a plane combining unit that calculates a three-dimensional relative location relationship between planes of each feature extracted by the plane extracting unit to generate a three-dimensional model representing the whole structure of each feature.

* * * * *